(12) United States Patent
Koh et al.

(10) Patent No.: US 12,306,777 B1
(45) Date of Patent: May 20, 2025

(54) HIERARCHICAL COLLECTIVE COMPUTE OPERATIONS USING DMA TRANSFERS

(71) Applicant: Amazon Technologies, Inc., Seattle, WA (US)

(72) Inventors: Yongseok Koh, San Jose, CA (US); Se Wang Oh, Campbell, CA (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 242 days.

(21) Appl. No.: 18/193,291

(22) Filed: Mar. 30, 2023

(51) Int. Cl.
*G06F 13/28* (2006.01)
*G06N 3/091* (2023.01)

(52) U.S. Cl.
CPC .............. *G06F 13/28* (2013.01); *G06N 3/091* (2023.01)

(58) Field of Classification Search
CPC ................................ G06F 13/28; G06N 3/091
See application file for complete search history.

(56) References Cited

U.S. PATENT DOCUMENTS

| | | | | |
|---|---|---|---|---|
| 6,330,623 | B1* | 12/2001 | Wu ......................... | G06F 13/28 710/33 |
| 8,205,019 | B2* | 6/2012 | Brink .................. | G06F 11/1076 709/212 |
| 10,826,762 | B2* | 11/2020 | Byers ........................ | H04L 9/50 |
| 11,145,291 | B2* | 10/2021 | Rusak ..................... | G06F 40/56 |
| 2014/0047451 | A1* | 2/2014 | Archer .................. | G06F 9/5061 718/104 |
| 2022/0113974 | A1* | 4/2022 | Omer ................... | G06F 15/7821 |
| 2024/0152761 | A1* | 5/2024 | Chole .................... | G06N 3/091 |

\* cited by examiner

*Primary Examiner* — Henry Tsai
*Assistant Examiner* — Christopher A Daley
(74) *Attorney, Agent, or Firm* — Weaver Austin Villeneuve & Sampson LLP

(57) ABSTRACT

Techniques are described to perform hierarchical collective compute operations on a plurality of processing nodes for a distributed computation of a neural network. Each processing node can include a plurality of processing ranks that are assigned corresponding rank identifiers (IDs). The hierarchical collective compute operation can include direct memory access (DMA) transfers to perform an inter-node collective compute operation of non-contiguous memory regions across the processing nodes based on the rank IDs, and an intra-node collective compute operation of non-contiguous memory regions within each of the processing nodes based on the rank IDs.

22 Claims, 16 Drawing Sheets

US 12,306,777 B1

HIERARCHICAL COLLECTIVE COMPUTE OPERATIONS USING DMA TRANSFERS

BACKGROUND

Neural networks can be used to perform tasks such as recognizing an object in an image. In a neural network, input data is combined with weights to derive output data using activation functions. For example, a neural network may take an image as input data, and output a decision or likelihood that a certain object is in the image. The set of weights used in a neural network can be determined by a training process, in which the neural network can learn how to perform a certain computing task for an application. The training process involves supplying a neural network model with training input data and a corresponding reference output which supports a particular decision (e.g., a detection or a non-detection of an object in an image). The neural network can perform computations to combine the weights with the training input data to generate training output data, and the training output data can be compared against the reference output data to assess the accuracy of the neural network model. The weights of the neural network can be adjusted to minimize the differences between the training output data and the reference output data. To improve the likelihood of the neural network generating a correct decision, a large volume of training input data covering a large number of scenarios can be used to train the neural network. As a result, training a neural network may take a lot of time and computational resources.

BRIEF DESCRIPTION OF THE DRAWINGS

Various embodiments in accordance with the present disclosure will be described with reference to the drawings, in which.

DETAILED DESCRIPTION

One way to accelerate a training or inference process, especially for deep learning neural networks, is to use a distributed system in which the training or the inference process is distributed across multiple computing systems, each of which can be configured as a processing node. Each processing node may include a computing device, a server, multiple servers, or multiple levels of computing devices. Each processing node may include multiple processing ranks (e.g., ranks or worker nodes) to perform the operations of the training process including forward propagation operations, backward propagation operations, weight update operations, etc., or operations of an inference process. The processing ranks may include, for example, any of a neural network processor, neural network accelerator, a graphics processing unit (GPU), a field programmable gate array (FPGA), a processor or co-processor, an application specific integrated circuit (ASIC), and/or other suitable computing circuitry that support the arithmetic operations involved in the training or the inference process.

Generally, distributed computations on large neural network models is performed using collective compute operations (e.g., all-reduce, all-gather, reduce-scatter, etc.) to share parameters between the processing nodes and the processing ranks within the processing nodes. For example, weight gradients computed by the backward propagation operations for each iteration of the distributed training process can be synchronized among the processing ranks using various collective compute operations. Each processing rank can communicate with other processing ranks to exchange weight gradients and perform weight updates after the exchange operations are completed. There is a need to be able to perform these collective compute operations efficiently to provide each processing rank with the proper neural network parameters for the distributed computations. Techniques are described herein to perform hierarchical collective compute operations for distributed computations that involve inter-node and intra-node communications via direct memory access (DMA) transfers with scatter-gather lists (SGLs).

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
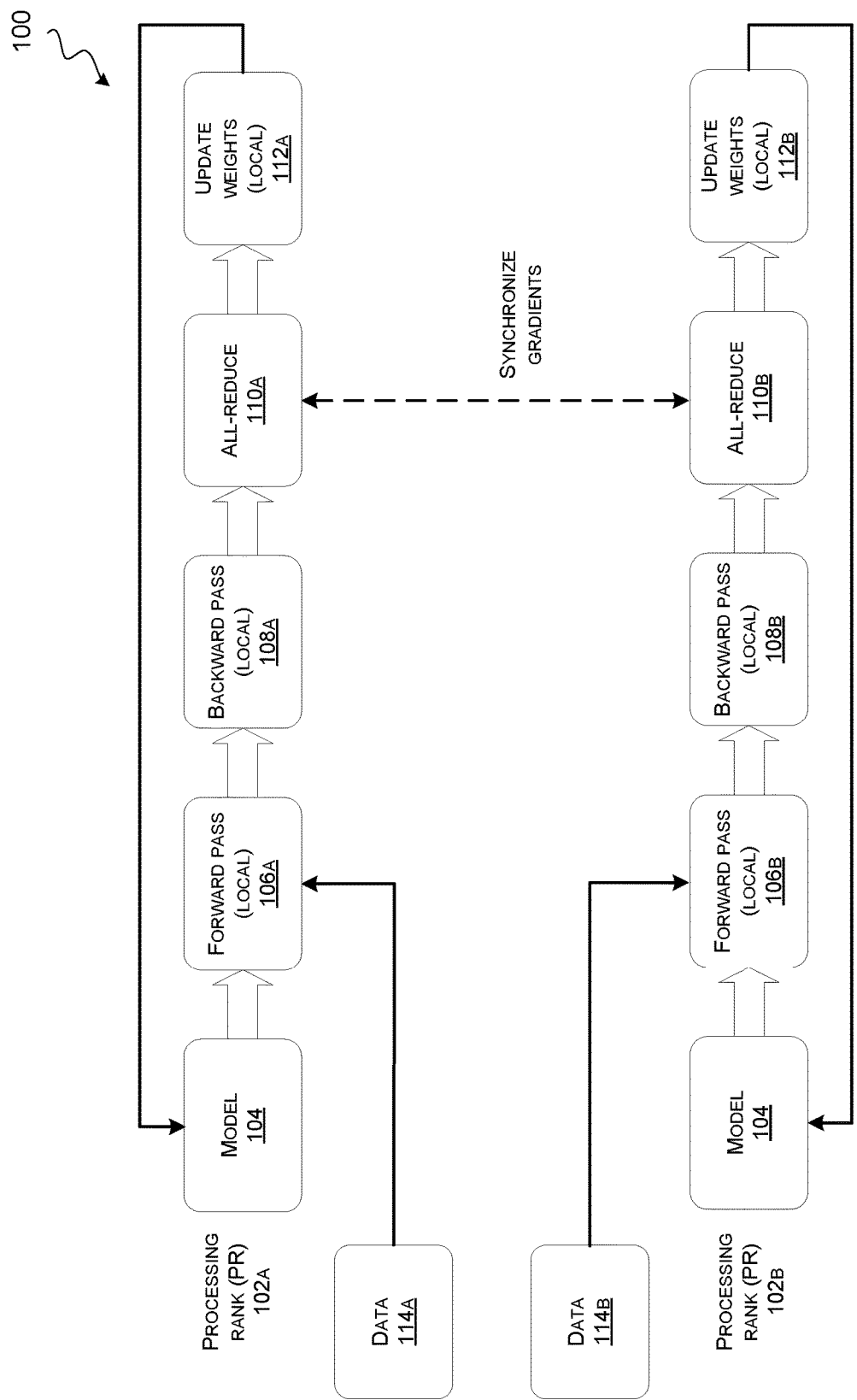
FIG. 1 illustrates an example of a data parallel training process to train a neural network.

FIG. 1 illustrates an example of a data parallel training process 100 to train a neural network.

The data parallel training process 100 can be performed by a plurality of processing ranks. Although FIG. 1 is described using only two processing ranks for ease of discussion, more than two processing ranks can be used. Each processing rank can include a neural network hardware accelerator, a graphics processing unit, or other suitable processing circuitry that can support the arithmetic operations involved in the neural network processing. Each processing rank may include one or more cores to operate on different data slices based on the implementation. The training can be based on a gradient descent scheme, which may include forward propagation operations, loss gradient operation, and backward propagation operations.

In distributed deep learning based on data parallelism, the input training data can be split into multiple portions, with each portion to be processed by a processing rank using the same neural network model and the same set of initial weights. As shown in FIG. 1, the input training data can be split into batches of training data comprising training data 114a and training data 114b, which can be processed by a processing rank (PR) 102a and a PR 102b using a neural network model 104 and a set of initial weights. As part of the training process, each PR 102a and PR 102b can execute local forward pass operations 106a and 106b on their portions of training data 114a and 114b, respectively. A forward pass operation may include matrix multiplication computations between the input data and the set of weights, followed by an activation function processing to generate output data. Each PR 102a and PR 102b can further perform local backward pass operations 108a and 108b, respectively, to adjust the set of weights based on a comparison of the training output data with a reference output data. For example, a set of weight gradients can be calculated from the loss based on the error or the difference between the training output data and the reference output data to determine the amount of adjustment to make to each weight value to improve the accuracy of the neural network.

At each iteration of the training process, each set of weight gradients can be synchronized among the processing ranks using a gradient exchange process. Each processing rank can communicate with other processing ranks to exchange weight gradients and perform weight updates after the exchange operations are completed. For example, the PR 102a and the PR 102b can perform an all-reduce operation 110a-110b, respectively, to synchronize their set of weight gradients between each other. The all-reduce operation 110a-110b can perform reductions on the gradient values computed by both the PRs 102a, 102b to generate reduced gradient values (e.g., average) that can be used to perform local weight updates 112a and 112b by each PR 102a and 102b, respectively. The updated weight values can be fed back to the model 104 by each PR 102a and 102b to be used for the next iteration of the training process. The training process 100 can be repeated for a number of iterations until a loss objective is achieved, such as minimizing the error or until the error lowers to a certain threshold.

The training process described in FIG. 1 using distributed data parallelism may require parameters of the entire model 104 (e.g., weights, gradients, etc.) to fit in the buffer memory of each of the PRs 102a and 102b, which may have limitations based on the implementation. Thus, based on the size of the model 104, and the application of the neural network, a sharded approach may be needed for the data parallel training process. For example, some applications that involve large amounts of data (e.g., natural language processing) may consume more memory to store parameters such as weights and gradients, and, therefore, may pose a greater challenge. The sharded approach is further described with reference to FIG. 2.

Figure 2:
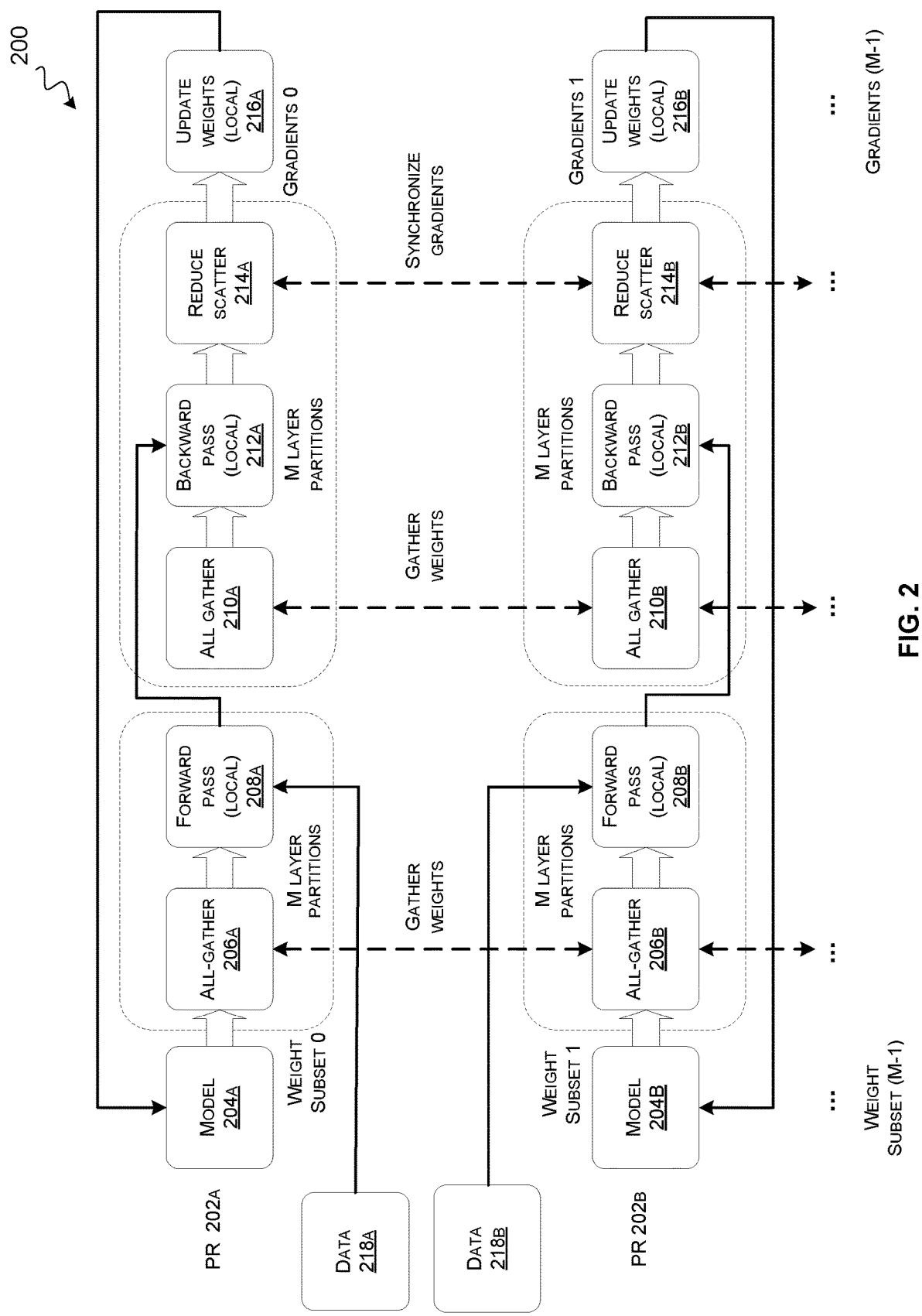
FIG. 2 illustrates an example of a fully sharded data parallel training process to train a neural network.

FIG. 2 illustrates an example of a fully sharded data parallel training process 200 to train a neural network. In some implementations, for training large models, the model parameters (e.g., weights, gradients, etc.), can be sharded across the processing ranks to provide a larger memory footprint that combines the buffer memories of the processing ranks. For example, the neural network model parameters and the training dataset can be split up and distributed among the plurality of processing ranks.

As shown in FIG. 2, the neural network model can be partitioned into M partitions including a model 204a with weight subset 0 and a model 204b with weight subset 1, and so on. The input training data may be partitioned into M batches of data comprising data 218a and data 218b, and so on. For a model that is partitioned into M partitions, M number of processing ranks can be used to train the model. Each partition may include one or more neural network model layers. A PR 202a can be responsible for the weight subset 0, a PR 202b can be responsible for the weight subset 1, and so on. Collective compute operations can be executed to gather the weights from other processing ranks during execution of the local forward pass operations 208a and 208b, respectively. In some implementations, the gathered weights from the other processing ranks for each partition of the model can be discarded after being used in the forward passes to free-up the memory for the next partition's computations. Similarly, the PR 202a and the PR 202b can perform all-gather operations 210a and 210b to gather the weights for performing local backward pass operations 212a and 212b, respectively. The gathered weights for each partition of the model can also be discarded after being used in the backward passes to free-up the memory for the next partition's computations.

Reduce-scatter operations 214a and 214b can be performed to synchronize and reduce the gradients computed by the backward propagation operations 212a and 212b. In this example, the PR 202a may have gradients (e.g., gradient 0) from one training data batch, and the PR 202b may have gradients (e.g., gradient 1) from one training data batch, and so on. Each processing rank is responsible for collecting and reducing the gradients from the other processing ranks to update the corresponding weight subset of the processing rank. Multiple iterations of the training process 200 can be performed to adjust the weights of each of the M partitions of the model. In some implementations, the training process can be repeated for a number of iterations until a loss objective is achieved, such as minimizing the error or until the error lowers to a certain threshold.

In some implementations, the processing ranks can be connected in a ring topology or a tree topology. However, for the ring topology, latency for collective compute operations can vary based on the number of processing ranks, which can have limited scalability and may not be very efficient for large clusters. For the tree topology, latency factor for collective compute operations can be logarithmic for the number of processing ranks, and the tree topology can provide scalable performance for larger clusters in most cases. However, the tree topology does not support all-gather and reduce-scatter collective operations that are needed for the fully sharded data parallel training process described with reference to FIG. 2.

A hierarchical approach to perform collective compute operations is described that supports all-gather and reduce-scatter collective operations used for the fully sharded data parallel training process. Generally, an intra-node operation can be performed to exchange the data between the processing ranks of the same processing node, and an inter-node operation can be performed to exchange the data between the processing ranks of different processing nodes. In some embodiments, the hierarchical collective compute operations can be performed using direct memory access (DMA) transfers with scatter-gather lists (SGLs), which can allow inter-node and intra-node operations of non-contiguous memory regions across the processing ranks. For example, the SGLs can be used to configure the memory descriptors for the DMA transfers based on the rank ID assigned to each PR and a storage size of the weights or gradients of each model partition 204a and 204b. In some implementations, the DMA transfers can be performed over a network.

Figure 3:
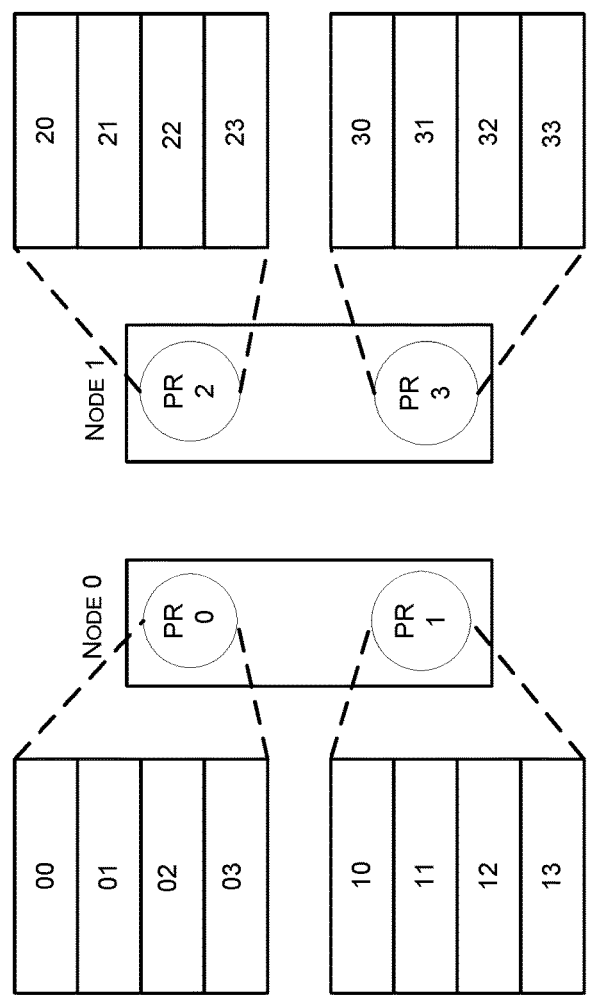
FIG. 3 illustrates an example configuration of two processing ranks each having two processing nodes to perform hierarchical collective compute operations for a distributed computation.

FIG. 3 illustrates an example configuration 300 of two processing ranks each having two processing nodes to perform hierarchical collective compute operations for a distributed computation.

Each processing rank on each processing node is assigned a rank identifier (ID). As an example, the r(i, n) can be the rank ID of intra-rank i on node n, where $0 \leq i < I$, and, $0 \leq n < N$. I is the number of ranks on each processing node, and N is the number of processing nodes. For the example of FIG. 3, I is 2, and N is 2. As shown in FIG. 3, two processing nodes may include a node 0 and a node 1. Node 0 includes two processing ranks PR 0 and PR 1, and node 1 includes processing ranks PR 2 and PR 3. The intra-rank ID (or local rank ID) of PR 0 on node 0 is "0", the local rank ID of PR 1 on node 0 is "1", the local rank ID of PR 2 on node 1 is "0", and the local rank ID of PR 3 on node 1 is "1." An overall rank ID of PR 0, PR 1, PR 2, and PR 3 is respectively, "0", "1", "2", and "3," and can be derived, for example, as (n*I)+i. In some examples, the dataset for each processing rank to exchange is split into (I*N) number of data slices, where (I*N) is the total number of ranks (e.g., 4). If the size of the dataset is S, the size of each data slice is s=S/(I*N).

In some implementations, the dataset at each PR to be exchanged with the other PRs can be, for example, gradients generated by the respective PR. Referring to FIG. 3, PR 0 may operate on a first portion of the training data to generate a set of gradients. The set of gradients can be divided into data slices 00, 01, 02, and 03 stored at respective indices 0, 1, 2, and 3 in the memory of PR0. PR 1 may operate on a second portion of the training data to generate a set of gradients comprising data slices 10, 11, 12, and 13 stored at respective indices 0, 1, 2, and 3 in the memory of PR1. PR 2 may operate on a third portion of the training data to generate a set of gradients comprising data slices 20, 21, 22, and 23 stored at respective indices 0, 1, 2, and 3 in the memory of PR2. PR 3 operates on a fourth portion of the training data to generate a set of gradients comprising data slices 30, 31, 32, and 33 stored at respective indices 0, 1, 2, and 3 in the memory of PR3. In some implementations, the data slices for each PR may be stored in a contiguous region of memory for each corresponding PR.

In some embodiments, a hierarchical all-reduce operation can be performed to exchange gradients among the processing ranks within each processing node and across the processing nodes. In some embodiments, the hierarchical all-reduce operation may include an intra-node reduce-scatter operation within the processing ranks of each processing node, an inter-node all-reduce operation between the processing nodes, and an intra-node all-gather operation within the processing ranks of each processing node. This is further described with reference to FIGS. 4A, 4B, and 4C using the example of the dataset in FIG. 3.

Figure 4A:
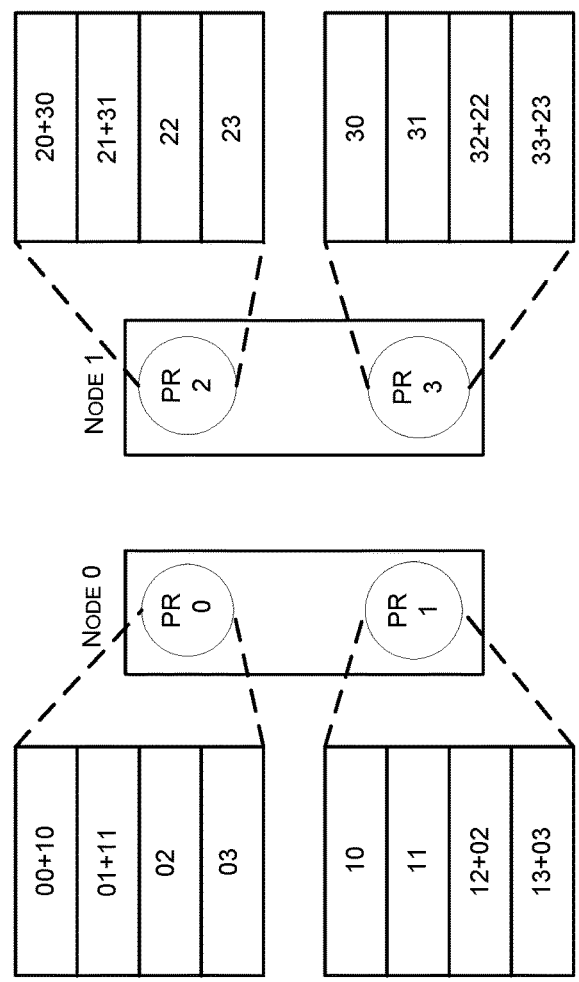
FIG. 4A illustrates an example of a first step of a hierarchical all-reduce operation for a distributed computation, according to some embodiments.

FIG. 4A illustrates an example configuration 400A of a first step of a hierarchical all-reduce operation for a distributed computation, according to some embodiments. The first step includes performing an intra-node reduce-scatter operation between the processing ranks of each processing node. The two processing nodes may include node 0 comprising the processing ranks PR 0 and PR 1 performing the intra-node reduce-scatter operation, and node 1 comprising the processing ranks PR 2 and PR3 performing the intra-node reduce-scatter operation.

With two processing ranks per processing node, each processing rank can operate on half of the portion of the given dataset in the intra-node reduce-scatter operation based on its local rank ID. More generally, the portion of the dataset that each rank operates on will be 1/I, where I is the number of processing ranks per processing node. As shown in FIG. 4A, PR 0 and PR 2 can collect the first half of the portion of each processing node, and PR 1 and PR 3 can collect the second half of the portion of each processing node. For example, PR 0 can perform the intra-node reduction on the data slices at the indices 0 and 1 based on its local rank ID of 0 within the node 0, and PR 1 can perform the intra-node reduction on the data slices at the indices 2 and 3 based on its local rank ID of 1 within the node 0. Similarly, PR 2 can perform the intra-node reduction on the data slices at the indices 0 and 1 based on its local rank ID of 0 within the node 1, and PR 3 can perform the intra-node reduction on the data slices at the indices 2 and 3 based on its local rank ID of 1 within the node 1. As shown in FIG. 4A, the intra-node reduction by PR 0 can produce "00+10" and "01+11", and by PR 1 can produce "12+02" and "13+03." Similarly, the intra-node reduction operation by PR 2 can produce "20+30" and "21+31", and by PR 3 can produce "32+22" and "33+23."

It should be noted that the symbol "+" refers to a reduction of the data slices, and the data slices can be combined in any number of ways. For example, "00+10" can refer to a summation of the corresponding data elements in the data slices "00" and "10", an average of the corresponding data elements in the data slices "00" and "10", or some other operation performed on the corresponding data elements in the data slices "00" and "01" to reduce corresponding data elements from the data slices into individual data elements.

Figure 4B:
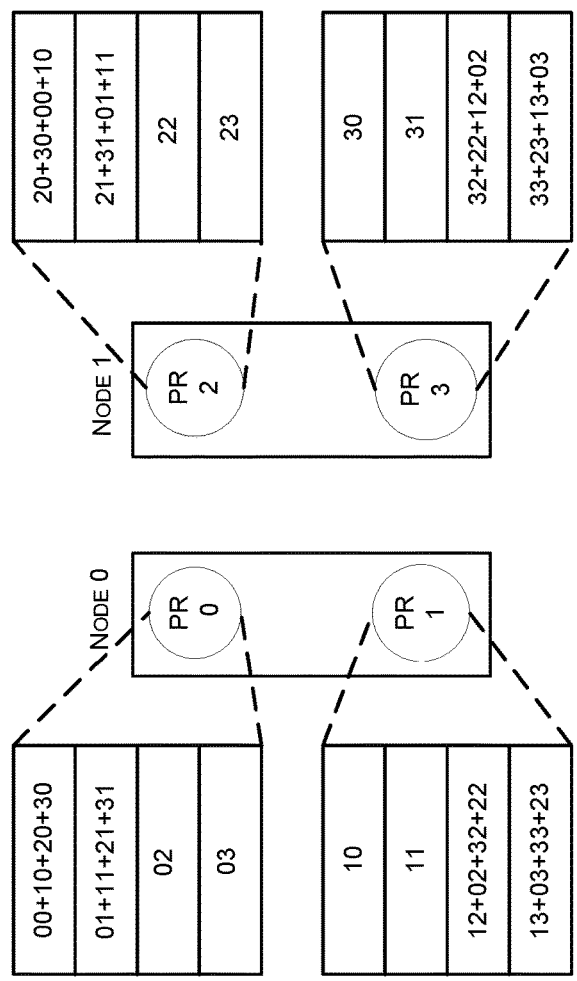
FIG. 4B illustrates an example of a second step for the hierarchical all-reduce operation for the distributed computation, according to some embodiments.

FIG. 4B illustrates an example of a second step for the hierarchical all-reduce operation for the distributed computation, according to some embodiments. The second step includes performing an inter-node all-reduce operation between the two processing nodes.

In the second step, an inter-node all-reduce operation can be performed between the corresponding processing ranks across the processing nodes. The inter-node all-reduce operation is performed on the portion of data that each processing rank reduced in the first step above. Hence, PR 0 of node 0 performs the all-reduce operation with PR2 of node 1 on the data slices at indices 0 and 1; and PR 1 of node 0 performs the all-reduce operation with PR3 of node 1 on the data slices at indices 2 and 3.

As shown in FIG. 4B, the inter-node all-reduce operation by PR 0 can produce "00+10+20+30" at index 0, and "01+11+21+31" at index 1, and by PR 1 can produce "12+02+32+22" at index 2, and "13+03+33+23" at index 3. Similarly, the inter-node all-reduce operation by PR 2 can produce "20+30+00+10" at index 0, and "21+31+01+11" at index 1, and by PR 3 can produce "32+22+12+02" at index 2, and "33+23+13+03" at index 3.

Figure 4C:
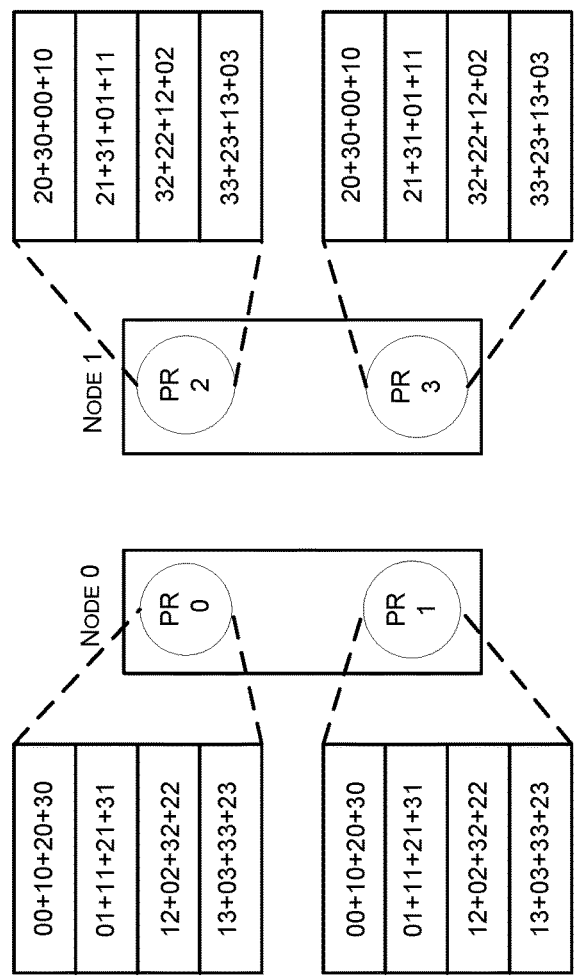
FIG. 4C illustrates an example of a third step for the hierarchical all-reduce operation for the distributed computation, according to some embodiments.

FIG. 4C illustrates an example of a third step for the hierarchical all-reduce operation for the distributed computation, according to some embodiments. The third step includes performing an intra-node all-gather operation to gather the reduced data between all the processing ranks within each processing node.

In the third step, an intra-node all-gather operation can be performed between the processing ranks on each processing node so that all the processing ranks have the same set of data. For example, an intra-node all-gather operation can be performed between PR 0 and PR 1 on node 0, and between PR 2 and PR 3 on node 1 to synchronize the reduced data that each PR produced in the second step.

As shown in FIG. 4C, the intra-node all-gather operation by PR 0 can obtain "12+02+32+22" at index 2, and "13+03+33+23" at index 3 from PR1, and PR 1 can obtain "00+10+20+30" at index 0, and "01+11+21+31" at index 1 from PR0. Similarly, the intra-node all-gather operation by PR 2 can obtain "32+22+12+02" at index 2, and "33+23+13+03" at index 3 from PR 3, and by PR 3 can obtain "20+30+00+10" at index 0, and "21+31+01+11" at index 1 from PR 2.

Some hierarchical collective compute operations (e.g., reduce-scatter) are dependent on the order of the rank ID. For example, for the reduce-scatter operation, a processing rank with a rank ID(p) is expected to have the $p^{th}$ slice of the final reduced data. However, the rank ID is generally assigned (e.g., by the user) to each processing rank with respect to the total number of processing ranks across multiple processing nodes. In most cases, reduced data generated by a reduce-scatter operation may be scattered among different processing ranks based on the rank ID. However, based on the assignment of the rank ID by the user, the reduced data may be placed in the wrong order among the processing ranks, which can produce incorrect results for the gradient exchange process.

Some embodiments can use DMA transfers to perform the hierarchical collective compute operations of non-contiguous memory regions that can allow configuring the order of data placement based on the rank IDs. For example, DMA transfers can be configured to perform operations like gather, reduce, scatter, etc., during data movement between different memories. As an example, model parameters like weights, gradients, etc. can be moved between the processing ranks using DMA transfers. The DMA memory descriptors may include various parameters associated with the data transfer such as an address (e.g., source address for read, target address for write) and a data transfer size, which can be programmed by the software executing on a host processor of the computing system.

In some implementations, the intra-node collective compute operations and the inter-node collective compute operations for the hierarchical collective compute operations can be pipelined to optimize the inter-node and intra-node traffic. An amount of time to perform a hierarchical collective compute operation may depend upon which of the intra-node collective compute operation or the inter-node collective compute operation takes longer to complete through the pipeline. For example, if the intra-node collective compute operation takes T1 amount of time to complete, and the inter-node collective compute operation takes T2 amount of time to complete, the amount of time taken by the overall hierarchical collective compute operation may equate to a maximum of T1 or T2, instead of the sum of T1 and T2.

Figure 5A:
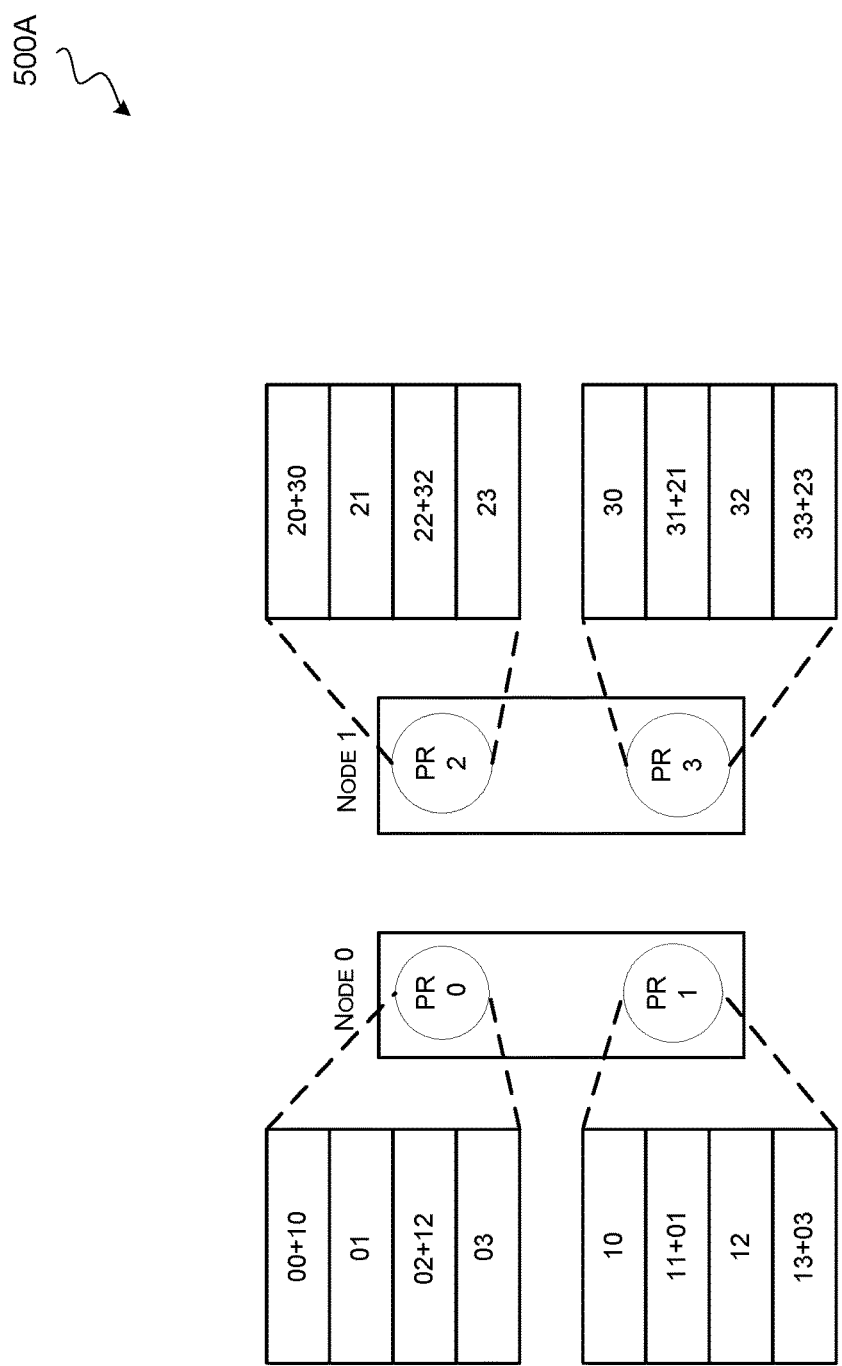
FIG. 5A illustrates an example of a first step of a hierarchical reduce-scatter operation for the distributed computation, according to some embodiments.

FIG. 5A illustrates an example of a first step of a hierarchical reduce-scatter operation for the distributed computation, according to some embodiments.

The hierarchical reduce-scatter operation may include reduce-scatter DMA transfers to perform an intra-node reduce-scatter operation of non-contiguous memory regions within each of the processing nodes, and an intra-node all-gather operation of non-contiguous memory regions across the processing nodes. The first step includes performing an intra-node reduce-scatter operation between the processing ranks within each processing node. In some examples, the hierarchical reduce-scatter operation can be performed, for example, as part of a fully sharded data parallel training process to synchronize the gradients from each processing rank to the other processing ranks. As an example, the two processing nodes may include node 0 comprising the processing ranks PR 0 and PR 1 to perform the intra-node reduce-scatter operation, and node 1 comprising the processing ranks PR 2 and PR3 to perform the intra-node reduce-scatter operation.

In some embodiments, the DMA transfers can be performed using a scatter list comprising the memory descriptors for the DMA. As an example, if the input dataset is at address A, and the size of the portion of the dataset is S, the size of each data slice is s=S/(I*N), the scatter list of the data slice for the rank i for the reduce-scatter is {A+s*r(i, k)|0≤k<N}. As described with reference to FIG. 5A, k can be equal to 0 or 1 for N equal to 2 (e.g., 2 processing nodes).

In the first step, reduce-scatter DMA transfers can be performed for an intra-node reduce-scatter operation of non-contiguous memory regions within each of the processing nodes. For example, an intra-node reduce-scatter DMA transfer can be performed to reduce the data between the same portion of the dataset on the two processing ranks within each processing node. As shown in FIG. 5A, a reduce-scatter operation is performed between PR 0 and PR 1 such that PR 0 has "00+10" at the index 0, and "02+12" at the index 2, and PR 1 has "11+01" at the index 1, and "13+03" at the index 3. Similarly, a reduce-scatter operation is performed between PR 2 and PR 3 such that PR 2 has "20+30" at the index 0, and "22+32" at the index 2, and PR 3 has "31+21" at the index 1, and "33+23" at the index 3.

Figure 5B:
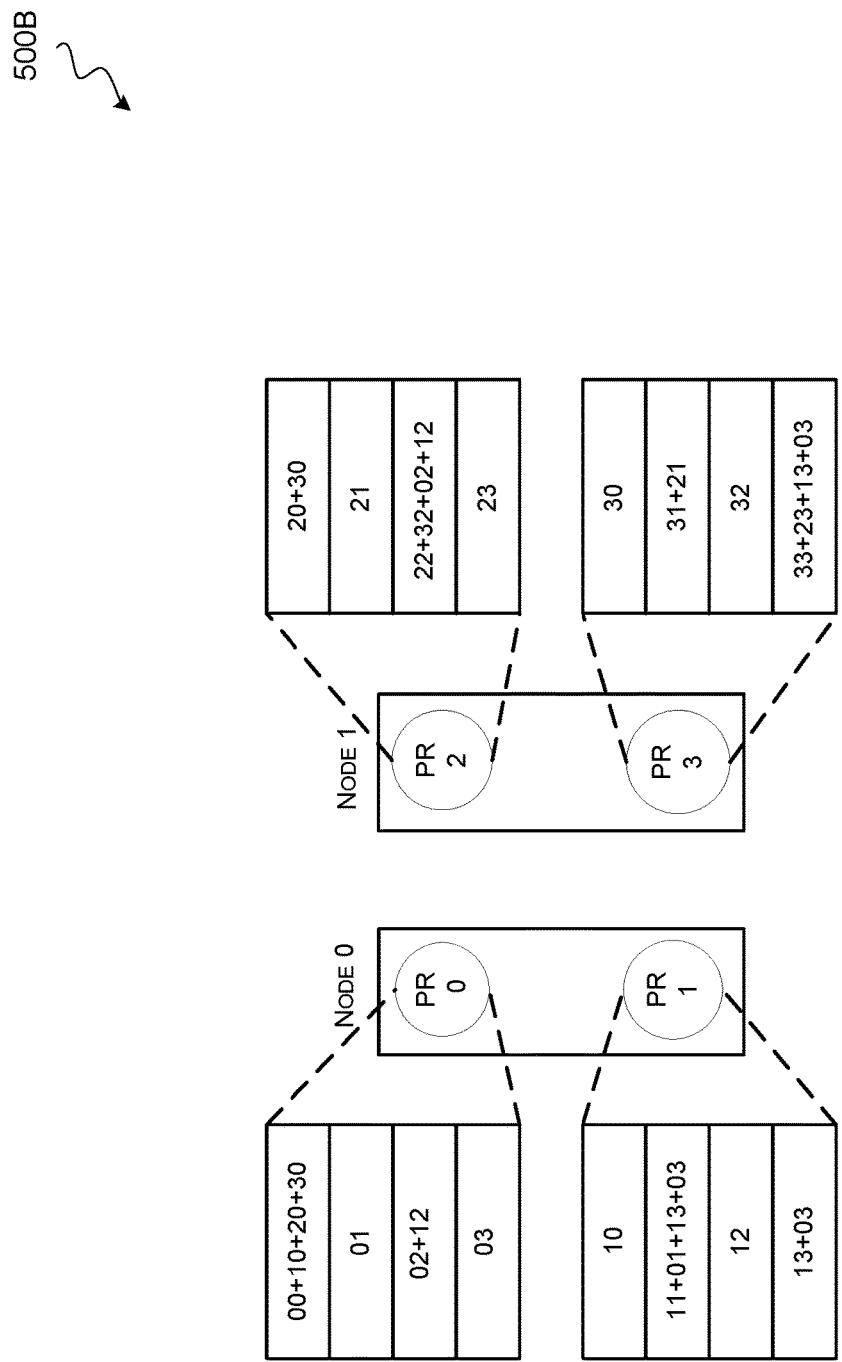
FIG. 5B illustrates an example of a second step for the hierarchical all-reduce operation for the distributed computation, according to some embodiments.

FIG. 5B illustrates an example of a second step for the hierarchical all-reduce operation for the distributed computation, according to some embodiments. The second step includes performing an inter-node reduce-scatter operation between corresponding processing ranks across the processing nodes.

In the second step, reduce-scatter DMA transfers can be performed for an inter-node reduce-scatter operation of non-contiguous memory regions across the processing nodes. For example, an inter-node reduce-scatter DMA transfer can be performed to reduce the data slice that was reduced above in step 1 on the corresponding processing ranks across the processing nodes. As shown in FIG. 5B, a reduce-scatter operation is performed between PR 0 and PR 2 such that PR 0 has "00+10+20+30" at the index 0, and PR 2 has "22+32+02+12" at the index 2. Similarly, a reduce-scatter operation is performed between PR 1 and PR 3 such that PR 1 has "11+01+13+03" at the index 1, and PR 3 has "33+23+13+03" at the index 3.

Thus, using the scatter list for the DMA transfers that is generated based on the respective rank IDs of the processing ranks and the size of the data slices, intra-node and inter-node reduce-scatter operations can be performed on the non-contiguous memory regions without sacrificing the accuracy of the results. Note that the data slices here can represent the gradients of each model partition that need to be synchronized for the training process. The intra-node and inter-node reduce-scatter operations described with reference to FIGS. 5A-5B can also be performed for a distributed inference process. In some implementations, the inter-node reduce-scatter operation and the intra-node reduce-scatter operation can be pipelined to reduce the execution time. Instead of requiring a sum of the amount of time needed for the intra-node and the inter-node all-gather operations, the hierarchical reduce-scatter operation can be performed in an amount of time corresponding to the maximum of respective amounts of time spent to complete the inter-node reduce-scatter operation or the intra-node reduce-scatter operation.

Figure 6A:
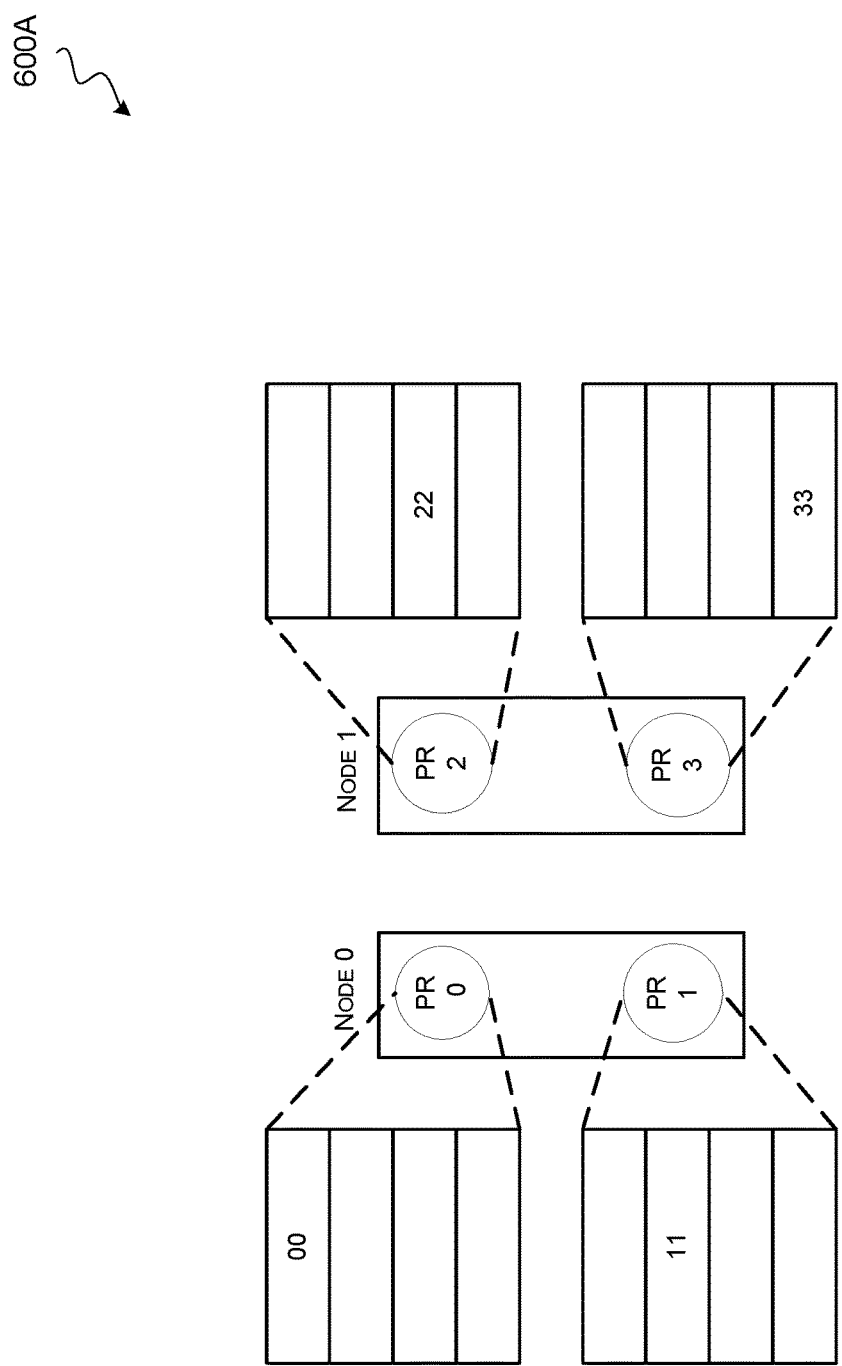
FIG. 6A illustrates an example configuration of two processing ranks each having two processing nodes to perform a hierarchical all-gather operation for a distributed computation, according to some embodiments.

FIG. 6A illustrates an example configuration 600A of two processing ranks each having two processing nodes to perform a hierarchical all-gather operation for a distributed computation, according to some embodiments.

The two processing nodes may include node 0 and node 1 comprising the processing ranks PR 0 and PR 1, and the processing ranks PR 2 and PR3, respectively. The hierarchical all-gather operation can be performed, for example, as part of a fully sharded data parallel training process to provide the weight subsets at each processing rank to the other processing ranks such that each processing rank has access to the full set of weights. Each processing rank can include a data slice at an index that corresponds to its overall rank ID. The data slice can be, for example, the weight subset partitioned to the corresponding processing rank. For example, PR 0 can include a data slice "00" at an index 0, PR 1 can include a data slice "11" at an index 1, PR 2 can include a data slice "22" at an index 2, and PR 3 can include a data slice "33" at an index 3. Collectively, the data slices may contain the full set of weights of a neural network model.

In some embodiments, the hierarchical all-gather operation includes all-gather DMA transfers to perform an inter-node all-gather operation of non-contiguous memory regions across the processing nodes, and an intra-node all-gather operation of non-contiguous memory regions within each of the processing nodes. The DMA transfers can be performed using a gather list comprising DMA memory descriptors. A gather list for the all-gather DMA transfers can be generated based on the respective rank IDs of the processing ranks and a storage size of the data slice. In some embodiments, if the output buffer of a processing node starts at address A, and the storage size of each data slice is s=S/(I*N), the gather list of the data slice on the output for the rank i can be {A+s*r(i, k)|0≤k<N}. In this example, k can be equal to 0 or 1 for N equal to 2 (e.g., 2 processing nodes), as shown in FIG. 6A. As an example, if the size S of the data portion for each processing rank is 4 KB, the storage size of each data slice s would be 1 KB.

Figure 6B:
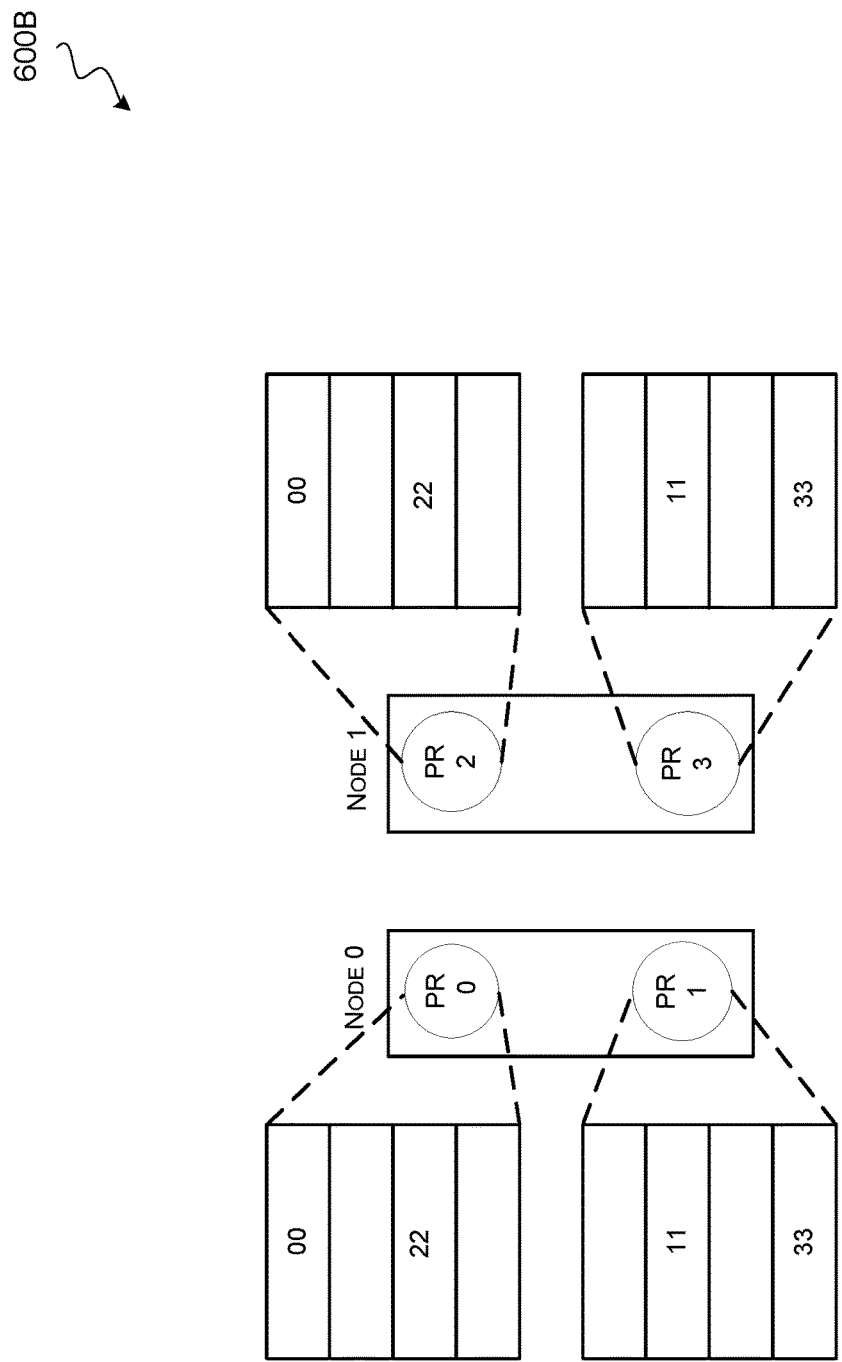
FIG. 6B illustrates an example of a first step for the hierarchical all-gather operation for the distributed computation, according to some embodiments.

FIG. 6B illustrates an example of a first step for the hierarchical all-gather operation for the distributed computation, according to some embodiments. The first step includes performing an inter-node all-gather operation between the corresponding processing ranks of the processing nodes.

In the first step, an all-gather DMA transfer can be performed for an inter-node all-gather operation of non-contiguous memory regions across the processing nodes. The all-gather DMA transfer can be performed between the processing ranks having the same local rank ID on different processing nodes to gather data slices from indices corresponding to their overall rank ID. An all-gather DMA transfer can be performed to synchronize the data between the corresponding ranks of each processing node. For example, the local rank 0 of node 0 (PR 0) can perform an all-gather operation with the local rank 0 of node 1 (PR2) such that PR2 obtains data slice "00" from PR 0, and PR 0 obtains data slice "22" from PR 2. Similarly, the local rank 1 of node 0 (PR 1) can perform an all-gather operation with the local rank 1 of node 1 (PR3) such that PR3 obtains data slice "11" from PR1, and PR 1 obtains data slice "33" from PR3.

Figure 6C:
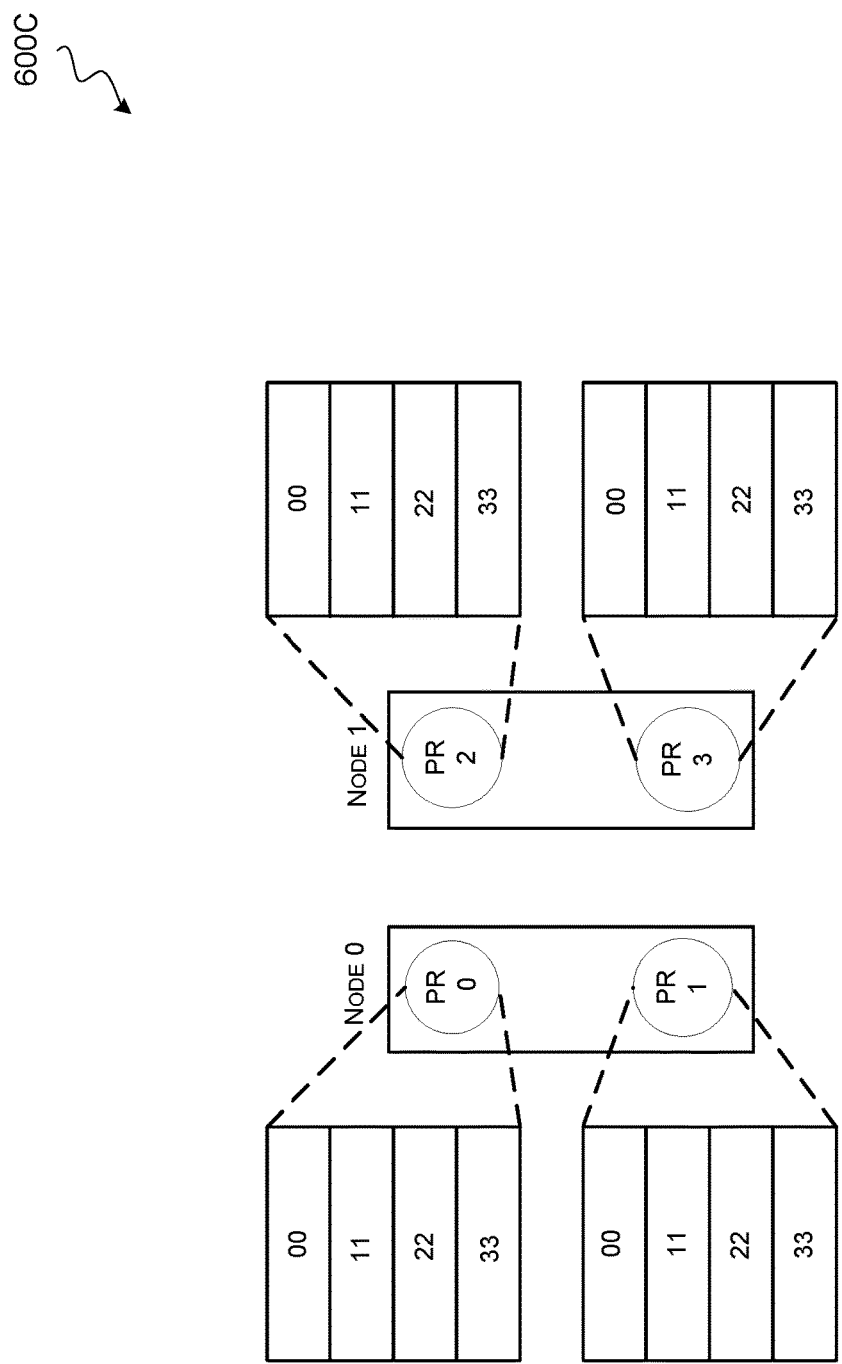
FIG. 6C illustrates an example of a second step for the hierarchical all-gather operation for the distributed computation, according to some embodiments.

FIG. 6C illustrates an example of a second step for the hierarchical all-gather operation for the distributed computation, according to some embodiments. The second step includes performing an intra-node all-gather operation between the processing ranks within each processing node.

In the second step, an all-gather DMA transfer can be performed for an intra-node all-gather operation of non-contiguous memory regions within each of the processing nodes. The all-gather DMA transfer can be performed between two processing ranks within each processing node to exchange data slices at indices corresponding to their local rank IDs. For example, an all-gather DMA transfer can be performed to synchronize the data between the same indices (e.g., same value of k in the list index r(i, k)) on the two processing ranks within the same processing node. As shown in FIG. 6C, for node 0, the data slice "00" is copied from PR 0 to PR 1 at the same index 0, the data slice "22" is copied from PR 0 to PR 1 at the same index 2, the data slice "11" is copied from PR 1 to PR 0 at the same index 1, and the data slice "33" is copied from PR 1 to PR 0 at the same index 3. Similarly, for node 1, the data slice "00" is copied from PR 2 to PR 3 at the same index 0, the data slice "22" is copied from PR 2 to PR 3 at the same index 2, the data slice "11" is copied from PR 3 to PR 2 at the same index 1, and the data slice "33" is copied from PR 3 to PR 2 at the same index 3.

Thus, using the gather list for the DMA transfers that is generated based on the respective rank IDs of the processing ranks and the size of the data slices, inter-node and intra-node all-gather operations can be performed on the non-contiguous memory regions. Note that the data slices here can represent the weights of each model partition to complete the model for the training process. The intra-node and inter-node all-gather operations described with reference to FIGS. 6A-6C can also be performed for a distributed inference process. In some implementations, the intra-node all-gather operation and the inter-node all-gather operation can be pipelined for the DMA transfers to reduce the execution time. Instead of requiring a sum of the amount of time needed for the intra-node and inter-node all-gather operations, the hierarchical all-gather operation can be performed in an amount of time corresponding to the maximum of respective amounts of time spent to complete the intra-node all-gather operation or the inter-node all-gather operation.

Figure 7:
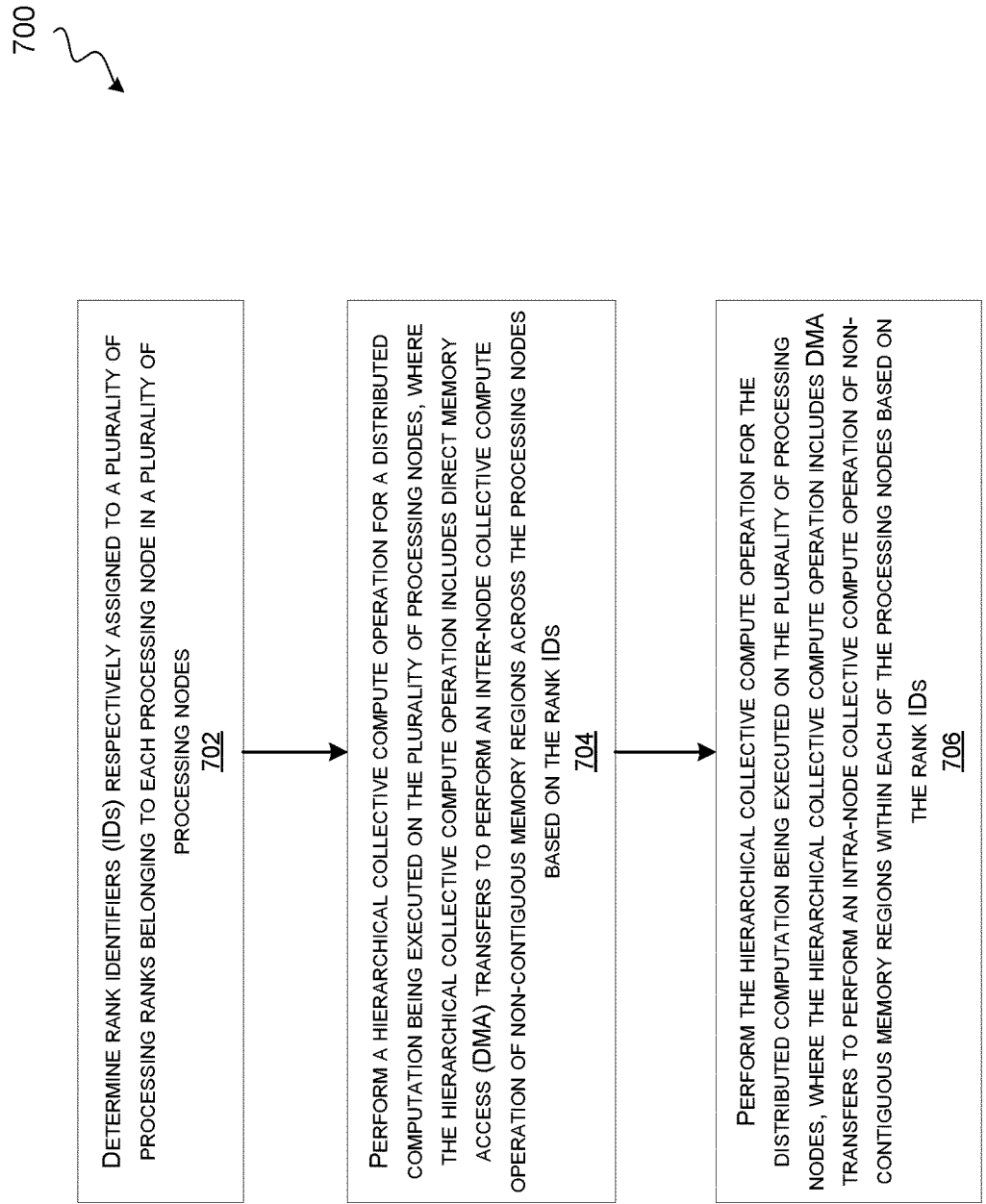
FIG. 7 illustrates an example flowchart for a method to perform a hierarchical collective compute operation for a distributed computation, according to some embodiments.

FIG. 7 illustrates an example flowchart 700 for a method to perform hierarchical collective compute operation for a distributed computation, according to some embodiments. As an example, the hierarchical collective compute operation can be performed for a distributed training process or a distributed inference process by a distributed system comprising a plurality of processing nodes. For example, the distributed training process can be the fully sharded data parallel training process 200 to train a neural network, as described with reference to FIG. 2.

In step 702, the method includes determining rank IDs respectively assigned to a plurality of processing ranks belonging to each processing node in a plurality of processing nodes. With I being the number of ranks on each processing node, and N being the number of processing nodes, r(i, n) can be the rank ID of intra-rank i on node n, where 0≤i<I, and, 0≤n<N. As an example, the plurality of processing nodes may include node 0 and node 1, and the plurality of processing ranks may include PR 0, PR 1, PR 2, and PR 3, described with reference to FIG. 3.

In step 704, the method includes performing a hierarchical collective compute operation for a distributed computation being executed on the plurality of processing nodes, where the hierarchical collective compute operation includes DMA transfers to perform an inter-node collective compute operation of non-contiguous memory regions across the processing nodes based on the rank IDs. In some examples, the distributed computation is for a distributed training process, and the hierarchical collective compute operation includes a hierarchical reduce-scatter operation, and the inter-node collective compute operation is an inter-node reduce-scatter operation described with reference to FIG. 5B. In some examples, the hierarchical collective compute operation includes a hierarchical all-gather operation, and the inter-node collective compute operation is an inter-node all-gather operation described with reference to FIG. 6A.

In step 706, the method includes performing the hierarchical collective compute operation for the distributed computation being executed on the plurality of processing nodes, where the hierarchical collective compute operation includes DMA transfers to perform an intra-node collective compute operation of non-contiguous memory regions within each of the processing nodes based on the rank IDs. In some examples, the distributed computation is for a distributed training process, and the hierarchical collective compute operation includes a hierarchical reduce-scatter operation, and the intra-node collective compute operation is an intra-node reduce-scatter operation described with reference to FIG. 5A. In some examples, the hierarchical collective compute operation includes a hierarchical all-gather operation, and the intra-node collective compute operation is an intra-node all-gather operation described with reference to FIG. 6B.

In various examples, the steps 704 and 706 can be performed in a different order. For example, when the hierarchical collective compute operation includes a hierarchical reduce-scatter operation, the step 706 can be performed before the step 704 to perform the intra-node reduce-scatter operation before the inter-node reduce-scatter operation. In another example, when the hierarchical collective compute operation includes a hierarchical all-gather operation, the step 704 can be performed before the step 706 to perform the inter-node all-gather operation before the intra-node all-gather operation.

The hierarchical all-gather operation can be performed during the forward passes 208a and 208b, or the backward passes 212a and 212b of the distributed training process 200 to transfer weights of a neural network model. The DMA transfers can be performed using a gather list comprising DMA memory descriptors. A gather list for the all-gather DMA transfers can be generated based on the respective rank IDs of the processing ranks and a storage size of the data slice. For example, if the output buffer of a processing node starts at address A, and the storage size of each data slice is s=S/(I*N), the gather list of the data slice on the output for the rank i can be $\{A+s*r(i,k)|0\leq k<N\}$.

The hierarchical reduce-scatter operation can be performed during the backward passes 212a and 212b of the distributed training process 200 to transfer gradients of a neural network model. For example, the DMA transfers can be performed using a scatter list comprising the memory descriptors for the DMA. As an example, if the input dataset is at address A, and the size of the portion of the dataset is S, the size of each data slice is s=S/(I*N), the scatter list of the data slice for the rank i for the reduce-scatter is $\{A+s*r(i,k)|0\leq k<N\}$.

Thus, hierarchical collective compute operations of non-contiguous memory regions can be performed using DMA transfers with SGLs, which can allow configuring the order of data placement based on the rank IDs without sacrificing the accuracy of the results. Furthermore, the inter-node collective compute operation and the intra-node collective compute operation for each hierarchical collective operation can be pipelined for the DMA transfers to optimize the inter-node and intra-node traffic. The techniques described herein can be used for any processes that perform distributed computations, e.g., distributed training or distributed inference for a neural network model.

Figure 8:
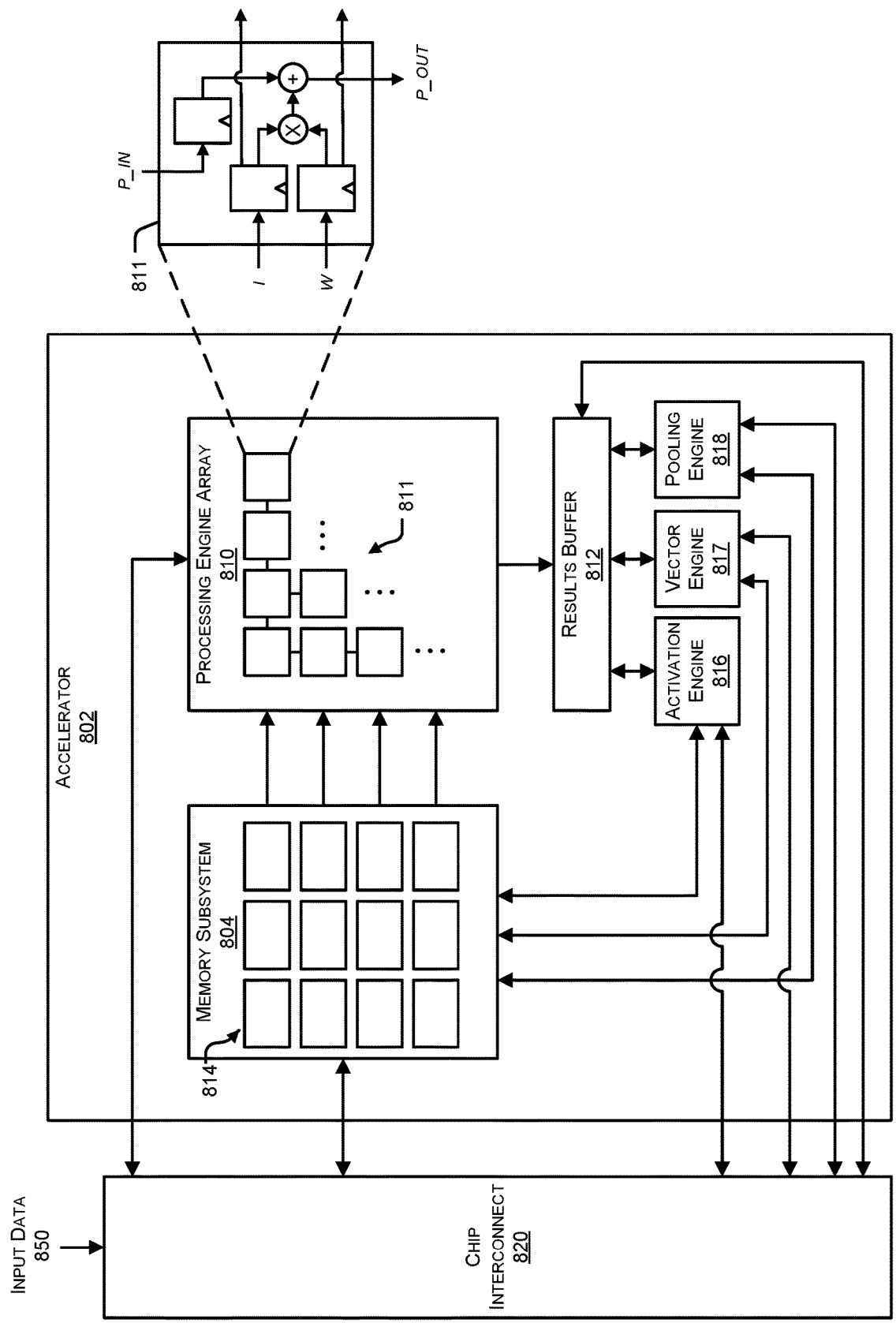
FIG. 8 illustrates a block diagram of an example of an integrated circuit device.

FIG. 8 is a block diagram illustrating an example of an integrated circuit device that can include a processing rank in a processing node. The example of FIG. 8 illustrates an accelerator 802. In various examples, the accelerator 802, for a set of input data (e.g., input data 850), can execute computations using a processing engine array 810, an activation engine 816, a vector engine 817, and/or a pooling engine 818. In some examples, the example accelerator 802 may be an integrated circuit component of a processor, such as a neural network processor. The processor may have other integrated circuit components, including additional accelerator engines. As an example, the accelerator 802 can be an example of the processing ranks PR 0, PR 1, PR 2, and PR 3, described with reference to previous figures.

In various implementations, the memory subsystem 804 can include multiple memory banks 814. Memory subsystem 804 can also be referred to as a state buffer. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the vector engine 817, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816, the vector engine 817, and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 128 rows, or some other number of columns and/or rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p_in, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, p_out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

In some implementations, the accelerator 802 can further include a vector engine 817. Vector engine 817 is a compute engine that can perform computations and manipulations on values stored in memory subsystem 804 and/or results buffer 812 such as values representing matrices of input values, weight values, intermediate results, etc. Vector engine 817 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 817 can operate in parallel and/or simultaneously. In some examples, the vector engine 817 can be bypassed or be omitted.

Herein, the activation engine 816, the vector engine 817, and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816, the vector engine 817, and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
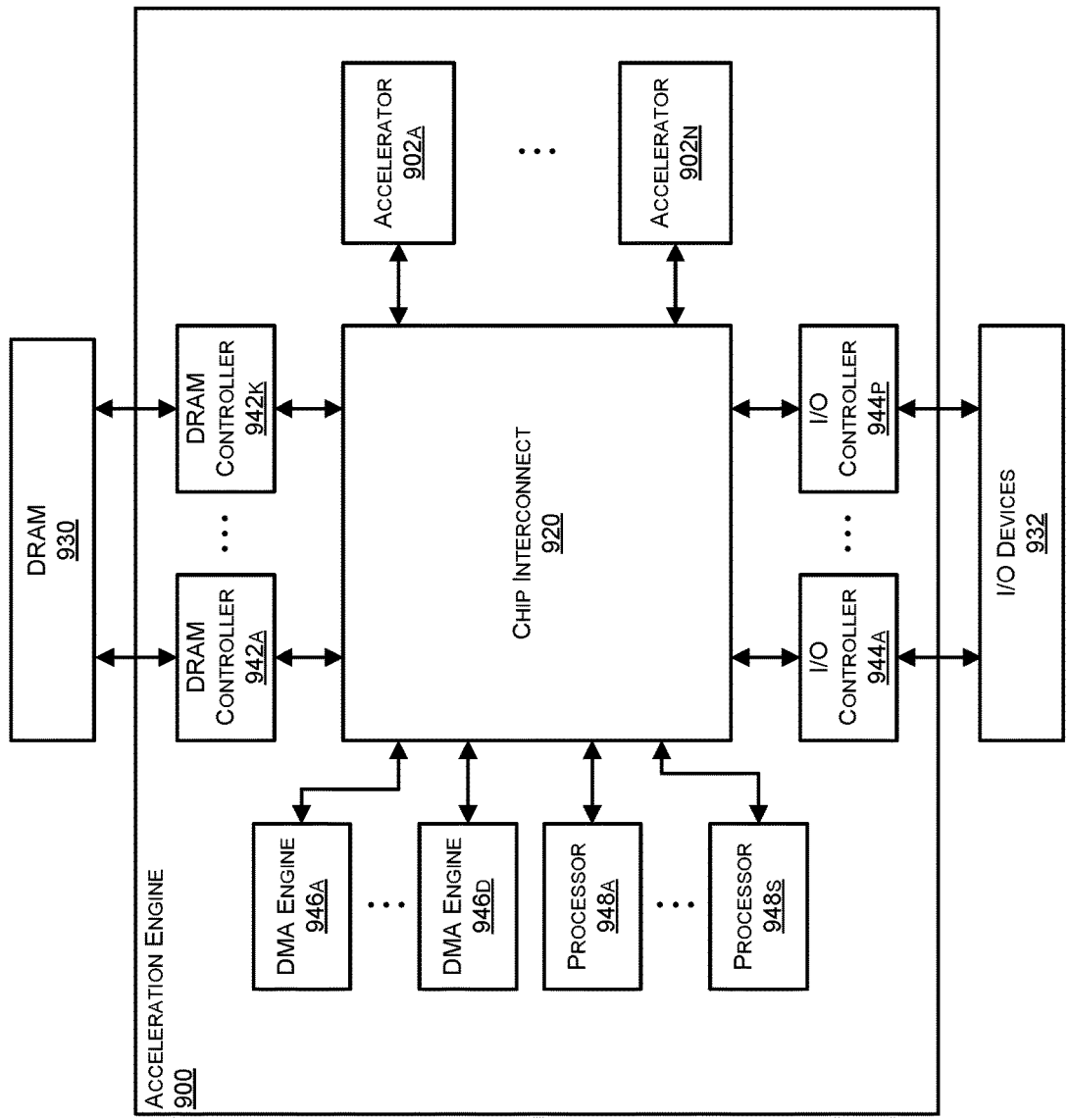
FIG. 9 illustrates a block diagram of an example of an acceleration engine.

FIG. 9 includes a block diagram that illustrates an example of an acceleration engine 900. The acceleration engine 900 is an example of an integrated circuit that can include one or more accelerators 902a-902n that may be similar to the accelerator illustrated in FIG. 8.

In the example of FIG. 9, the acceleration engine 900 includes multiple accelerators 902a-902n, each of which can perform a set of operations. In various examples, the accelerators 902a-902n are for particular types of operations, so that the accelerators 902a-902n can perform the operations much faster than when similar operations are performed by a general-purpose processor. In various examples, to perform a set of operations, input data on which the operations are to be performed must first be moved into the accelerators 902a-902n. Additionally, in some cases, program code is also moved into the accelerators 902a-902n, which programs the operations that the accelerators 902a-902n will perform on the data. In the illustrated example, the acceleration engine 900 includes n accelerators 902a-902n. Examples of accelerators that can be included in the acceleration engine 900 include graphics accelerators, floating point accelerators, neural network accelerators, and others. In various examples, the accelerators 902a-902n can each be the same (e.g., each of the is a graphics accelerator) or can be different (e.g., the accelerators 902a-902n include a graphics accelerator, a floating point accelerator, and neural network accelerator).

The example acceleration engine 900 further includes DRAM controllers 942a-942k for communicating with an external memory. The external memory is implemented, in this example, using DRAM 930. In the illustrated example, the acceleration engine 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerators 902a-902n to perform different operations. For example, when one of the accelerators is a neural network accelerator, one program can configure the neural network accelerator to perform speech recognition while another program can configure the neural network accelerator to perform image recognition. In various examples, different accelerators 902a-902n can be programmed with different programs, so that each performs a different set of operations. In various examples, the processors 948a-948s can manage moving of program code from the DRAM 930 to the accelerators 902a-902n.

The example acceleration engine 900 further includes I/O controllers 944a-944p for communicating with I/O devices 932 in the system. The acceleration engine 900 can communicate with I/O devices over, for example, a processor bus. In some examples, the processor bus can be implemented using Peripheral Component Interconnect (PCI)

and/or a variation of the PCI bus protocol. The processor bus can connect the acceleration engine 900 to I/O devices such as, for example, input and output devices, memory controllers, storage devices, and/or network interface cards, among other things. In some examples, the I/O controllers 944-944p can enable the acceleration engine 900 to act as an I/O device for a host processor. For example, the acceleration engine 900 can be the recipient of input data from the host processor, and a command indicating an operation to be performed on the input data (e.g., a particular computation or analysis). In the illustrated example, the acceleration engine 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

Movement of data in the acceleration engine 900 can be managed by one or more processors 948a-948s, which can also be referred to as data management processors. In the example of FIG. 9, the acceleration engine 900 includes s processors 948a-948s incorporated into the device (e.g., on the same silicon die). In other examples, the processors 948a-948s can be external to the acceleration engine 900 (e.g., on a different die and/or in a different package). In some examples, the processors 948a-948s can manage the movement of data from I/O devices 932 to the accelerators 902a-902n or the DRAM 930. For example, input data may be located at an I/O device 932 or in processor memory, and the processors 948a-948s can move the input from the I/O device 932 or processor memory into an accelerator or into DRAM 930. As another example, program code for the accelerators 902a-902n may be located on an I/O device 932 or in processor memory.

The example acceleration engine 900 further includes DMA engines 946a-946d that can move data between the accelerators 902a-902n, DRAM controllers 942a-942k, and I/O controllers 944a-944p. In the illustrated example, the acceleration engine 900 includes d DMA engines 946a-946d. In some implementations, the DMA engines 946a-946d can be assigned to specific tasks, such as moving data from the DRAM controllers 942a-942d to the accelerators 902a-902n, or moving data between the I/O controllers 944a-944p and the accelerators 902a-902n. These tasks can be assigned, for example, by enqueueing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930. In some examples, the DMA engines 946a-946d can be used to perform hierarchical collective compute operation using SGLs described with reference to FIGS. 2, 3, 4A-4C, 5A-5B, 6A-6C, and 7.

In various examples, each of the processors 948a-948s can be responsible for managing the data movement for a different accelerator. In some examples, a processor may manage the data movement for more than one accelerator. Similarly, in various examples, each of the processors 948a-948s can be assigned to one or more DMA engines 946a-946d. In these and other examples, associations between processors 948a-948s, accelerators 902a-902n, and DMA engines 946a-946d are determined by program code being executed by each respective processor.

In the example acceleration engine 900, the various components can communicate over a chip interconnect 920. The chip interconnect 920 primarily includes wiring for routing data between the components of the acceleration engine 900. In some cases, the chip interconnect 920 can include a minimal amount of logic, such as multiplexors to control the direction of data, flip-flops for handling clock domain crossings, and timing logic.

Figure 10:
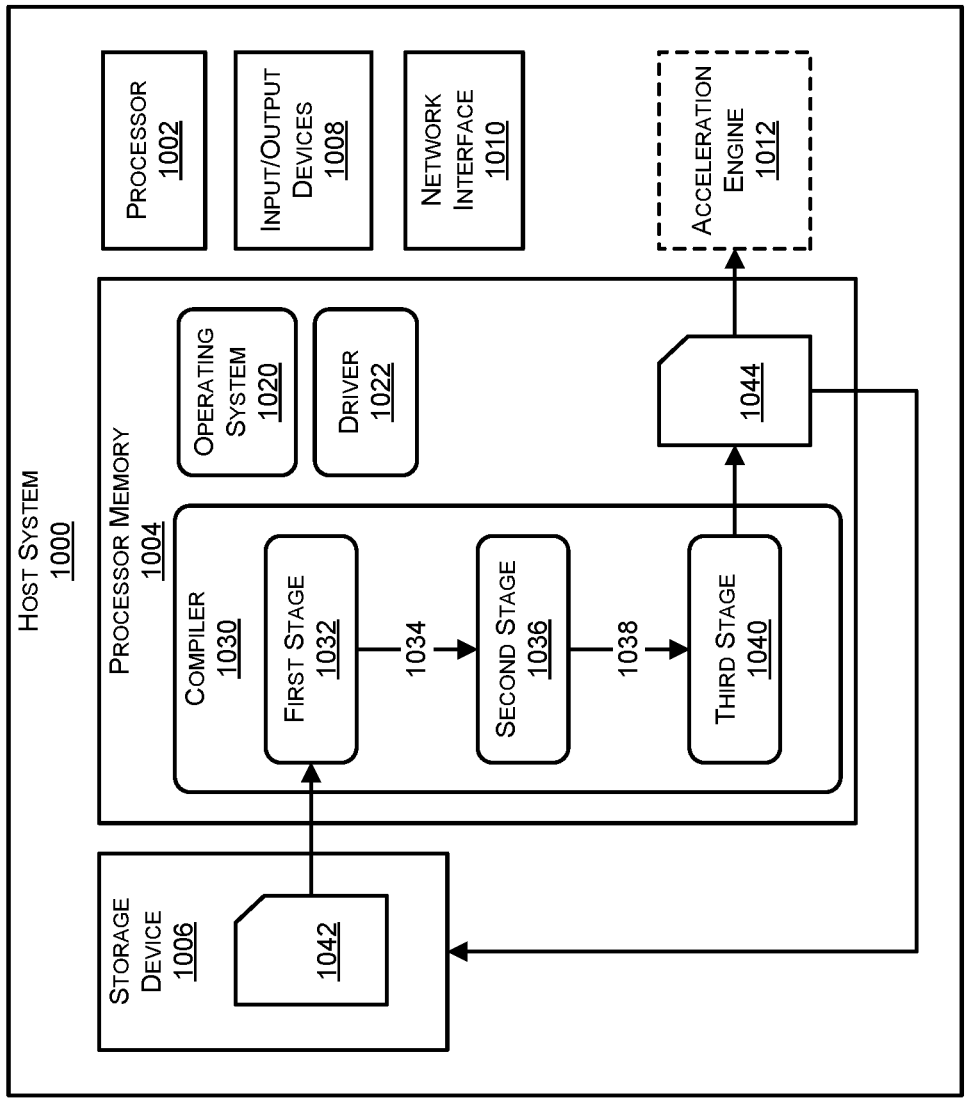
FIG. 10 illustrates a block diagram of an example of a compiler in a host system.

FIG. 10 illustrates a block diagram of an example of a host system 1000 on which a compiler 1030 can run. The illustrated host system 1000 is an example of a computing device, and includes a processor 1002, a processor memory 1004, at least one storage device 1006, various Input/Output (I/O) devices 1008, and at least one network interface 1010. In the example of FIG. 10, the host system 1000 also includes an acceleration engine 1012, which is an integrated circuit device that can accelerate certain operations or computations performed by the host system 1000. In various examples, the host system 1000 can be implemented as a server in a data center, a desktop computer, a laptop computer, a tablet computer, or a smartphone, among other examples. In some examples, operations or components discussed below as being performed or included in the host system 1000 can be performed or included in other computer devices. For example, the compiler 1030 can execute on the host system 1000 while the acceleration engine 1012 is located in a different host system or different computing device.

The processor 1002 is an integrated circuit device that can execute program code, in the form of instructions. The program code can be for various software applications or tools, such as an operating system 1020 or the illustrated compiler 1030. While the processor 1002 is executing a program, the instructions for the program can be stored in the processor memory 1004. The instructions can also be stored elsewhere, such as on the storage device 1006, and can be loaded into the processor memory 1004 when needed by the processor 1002. The processor 1002 can also use the processor memory 1004 for temporary storage of other data that the processor 1002 is operating on. In various examples, the processor memory 1004 is a volatile memory type, such as a type of random access memory, though non-volatile memory types can, alternatively or additionally, be used for the processor memory 1004.

The storage device 1006 is an example of a device that can include non-volatile memory. For example, the storage device 1006 can be a magnetic disk drive, a solid-state drive, or an optical drive, among other examples. Program code and other data stored on the storage device 1006 can remain present when the storage device 1006 is not powered on. Storage device 1006 can be uses as a type of non-transitory storage medium, or may include a reader that can access non-transitory storage medium.

The storage device 1006 is one example of a peripheral device. A peripheral device is a component that can be coupled to the host system 1000 to add functionality to the host system 1000. Other examples of peripheral devices include Input/Output devices 1008 and network interface 1010. The Input/Output devices 1008 can include user input and/or output devices, such as keyboard, mouse, pointer, touchpad, touchscreen, microphone, display screen, speaker, printer, and scanner, among other examples. Network interface 1010, which can be implemented using a network interface card, can provide access to one or more networks. Network interface 1010 can include, for example, a physical port for connecting a network cable and/or one or more antennas and/or radios for wireless communication such as Wi-Fi, cellular, and/or other over-the-air networks. Network interface 1010 can also be described as an I/O device.

The acceleration engine 1012 is also another type of peripheral device or I/O device. The acceleration engine 1012 is a device that is purpose-built to perform certain operations that can be performed by the processor 1002, but can be performed faster by the acceleration engine 1012. For example, the acceleration engine 1012 can be a neural network accelerator that is capable of performing large scale, parallel computations of a neural network more efficiently than when the computations are performed by the processor 1002. As another example, the acceleration engine 1012 can be a graphics processing unit (GPU), and may be optimized to perform the computations needed for graphics rendering. Other examples of devices that can be implemented by the acceleration engine 1012 include cryptographic accelerators, compression and decompression accelerators, 3-D accelerators, regular expression accelerators, security accelerators, and others.

In various examples, the acceleration engine 1012 can execute program code to perform certain operations. For example, when the acceleration engine 1012 is a neural network accelerator, the acceleration engine 1012 can be programmed to execute a particular neural network model, such as one that performs image recognition or one that performs machine translation. As a further example, to support the execution of a neural network model, the acceleration engine 1012 can be programed to perform operations such as copying data for the neural network between processor memory 1004 and the acceleration engine 1012 (e.g., copying input data for the neural network from processor memory 1004 into the acceleration engine 1012, copying results from the acceleration engine 1012 into the processor memory 1004, etc.).

To generate program code for the acceleration engine 1012, the host system 1000 can execute the compiler 1030. Compilers, in general, are software programs that translate program code written in a human-readable language into a format (e.g., machine instructions) that can be read and processed by an integrated circuit device. In the example of FIG. 10, the acceleration engine 1012 can be a neural network accelerator, and the compiler 1030 can be a compiler for compiling a neural network description into instructions to be executed by the acceleration engine 1012. When the acceleration engine 1012 implements a different type of accelerator, a different compiler can be used.

The compiler 1030 can be activated, for example, when the operating system 1020 receives keyboard, mouse, touchscreen, voice command, or other inputs from the Input/Output devices 1008. The inputs can further include parameters for the compiler 1030, such as input code 1042 to compile and configuration options for the compilation process. Once the compiler 1030 is activated, the processor 1002 can load the instructions for the compiler 1030 into the processor memory 1004, and execute the compiler from the processor memory 1004. In some implementations, compiler 1030 may identifying steps to be performed by the processor 1002, rather than by the acceleration engine 1012. For example, the processor 1002, through the execution of a driver 1022, may need to perform steps such as configuring Direct Memory Access (DMA) descriptors for moving data into or out of the acceleration engine 1012, among other examples.

In the example of FIG. 10, the compiler 1030 includes a first stage 1032, a second stage 1036, and a third stage 1040, which each perform different operations to produce compiled code 1044. In other examples, the compiler 1030 can combine the operations of the first stage 1032, second stage 1036, and/or third stage 1040 into fewer stages, or can divide the operations of one or more of the stages into multiple stages. In some implementations, compiler 1030 can also be modified such that certain operation(s) from one stage can be executed in a different stage.

The first stage 1032 (may also be referred to as the front stage) can receive and process input code 1042. The input code 1042 can describe a program in a high-level programming language, such as Python, Java, C++, among other examples, and may utilize software libraries tailored for neural networks such as TensorFlow, PyTorch, etc. The input code 1042 can be a description of a neural network model that describe, for example, steps to perform image recognition, speech recognition, machine translation, or other operations. The input code 1042 can be obtained from the storage device 1006. Alternatively, though not illustrated, the input code 1042 can be located in the processor memory 1004, or can be obtained from a network location using the network interface 1010.

Processing of the input code 1042 can include parsing the input code 1042, performing syntax and semantic analysis on the input code 1042 to identify operators (e.g., operations such as computations, memory accesses, and/or other functions, etc.) described in the input code 1042, and sorting the operators described in the input code 1042. For example, the operators described in the input code 1042 can be sorted into layers, where the outputs of one layer provide the inputs to a next layer. The output of the first stage 1032 can be an intermediate representation (IR) 1034 of the input code 1042. In some implementations, the IR 1034 can be code representing a compute graph (e.g., data flow graph, data dependency graph, etc.). The compute graph may include nodes and edges connecting the nodes. The nodes may represent operators such as computations, data rearrangements such as transformations, memory accesses, and/or other operations; and the edges or connections between the nodes may represent dependencies between the nodes, such as data dependencies, memory dependencies, or operational dependencies, among other examples. The compute graph can be organized, for example, in the layers, nodes, and connections between nodes of a neural network model.

The second stage 1036 (may also be referred to as the middle-end stage) can perform intermediate processing on the IR 1034 output from the first stage 1032. The intermediate processing may include performing various optimizations on the IR 1034. The optimizations may include target independent optimizations that are hardware agnostic, and/or target specific optimizations that are tailored for the hardware architecture executing the program of input code 1042. Target independent optimizations may include algebraic simplification, graph minimization such as removal of unnecessary or redundant operations and/or dependencies, high-level dependency optimization by rearranging operators to improve compute latencies, etc.

Target specific optimizations include optimizations that take into account the capabilities of the hardware (e.g., acceleration engine 1012) that the input code is being compiled for. Such optimizations may include operators fusion to fuse multiple operators into an execution kernel supported by the hardware, data layout transformation to efficiently fit data into the hardware, etc. The target specific optimizations may take into account considerations such as whether the operations being performed in any one layer, or at any one node in a layer, may be too many for the acceleration engine 1012 to perform at the same time. The acceleration engine 1012 may, for example, have a limited amount of local storage space for the data needed for a computation, or the computations may be more than the acceleration engine 1012 can perform at one time. In such scenario, the operators of the layer or node can be broken down into smaller operations, which can fit into the acceleration engine's local memory and/or can fit into the computing capacity of the acceleration engine 1012. The output of the second stage 1036 can be an optimized IR 1038 such as code representing an optimized compute graph.

The third stage 1040 (may also be referred to as the back-end stage) can operate on the output 1038 of the second stage 1036, and perform various steps before producing the instructions (e.g., machine code) that are to be executed by the acceleration engine 1012. These steps can include instruction and data scheduling, register allocation, and/or code generation. Instruction and data scheduling determines the order in which instructions are executed and data are processed by the acceleration engine 1012, and may include low-level dependency optimization by rearranging operations to improve parallel execution, handling dependencies between nodes by inserting synchronization instructions into the code, etc. Register allocation may include identifying optimizations in register usage and/or memory bandwidth usage to avoid spilling, and reordering of register and/or memory accesses to hide access latencies given the memory capacity of the hardware, etc. Code generation converts the low-level optimized IR into machine code executable by the acceleration engine 1012, and includes mapping operations into hardware instructions according to the architecture of the acceleration engine 1012. The output of the third stage 1040 is compiled code 1044, which may include machine instructions in binary format. In some examples, the compiled code 1044 can be stored in the processor memory 1004. Alternatively or additionally, the compiled code 1044 can be copied to the storage device 1006 or to a network location. As noted above, the acceleration engine 1012 may be located at a different host system, in which case the compiled code 1044 can be sent over the network interface 1010 to the other host system.

In the example of FIG. 10, the host system 1000 can be executing a driver 1022, which can also be referred to as a device driver or runtime driver, that manages the acceleration engine 1012. The driver 1022 can provide an interface between applications executing on the host system 1000 (or on another host system) and the acceleration engine 1012. For example, the driver 1022 can provide an Application Program Interface (API) that defines functions for feeding input data to the acceleration engine 1012 and defining the operation to perform on the input data. In this and other examples, the driver 1022 can configure the acceleration engine 1012 to perform the operation. For example, the driver 1022 can identify a neural network model that the acceleration engine 1012 is to execute, as well as the location in the processor memory 1004 or on the storage device 1006 where the compiled code 1044 for the neural network model is located. The driver 1022 can further load into the acceleration engine 1012 or cause the acceleration engine 1012 to load the compiled code 1044, can load or cause the acceleration engine 1012 to load the input data on which the neural network model is to operate, and/or can cause the acceleration engine 1012 to begin executing on the input data. Once the acceleration engine 1012 has finished, the acceleration engine 1012 can notify the driver 1022, and the driver 1022 can deliver a result back to the application that requested the result.

Figure 11:
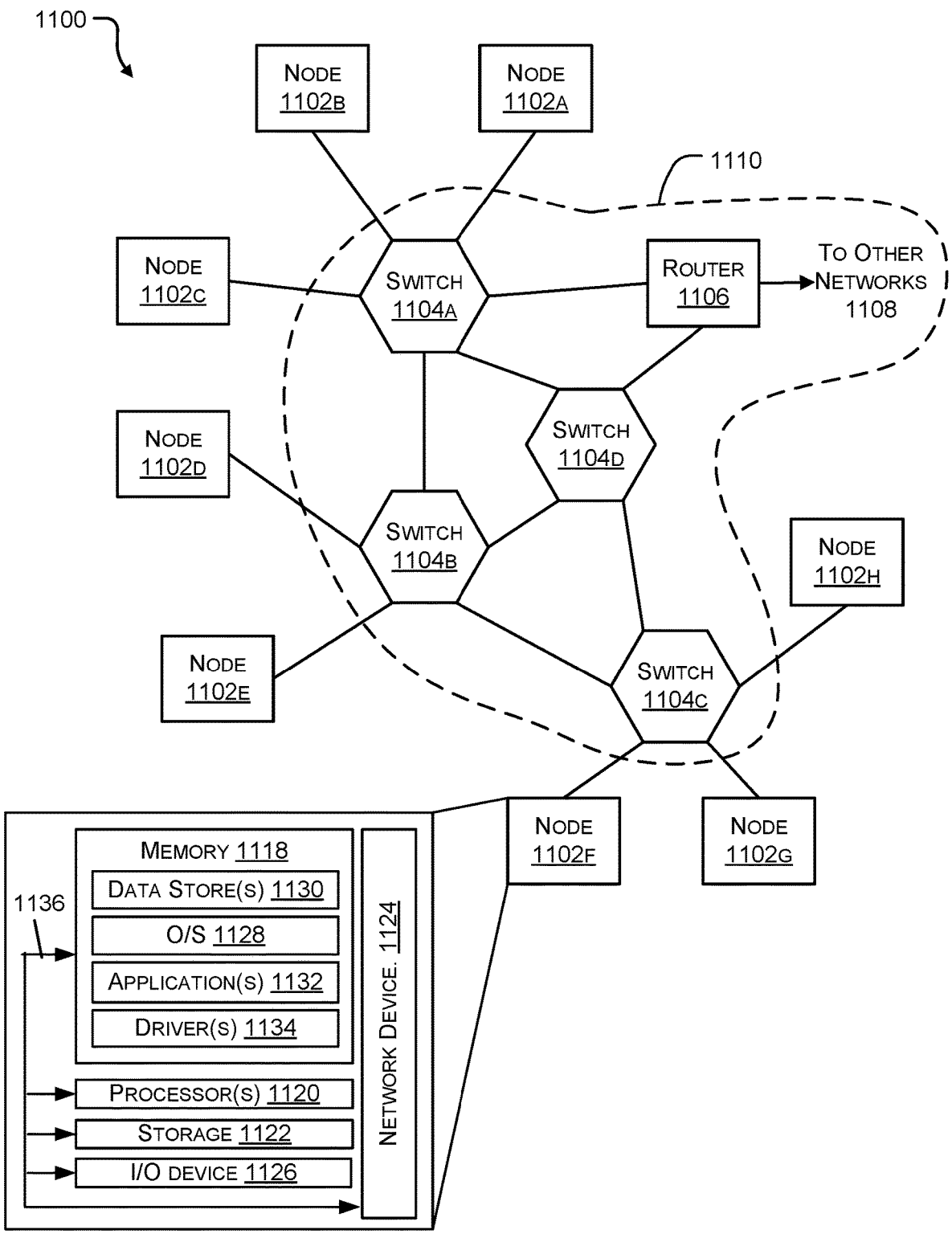
FIG. 11 illustrates a conceptual diagram of an example network.

FIG. 11 includes a diagram of an example network 1100, which can include one or more host systems, such as the host system illustrated in FIG. 10. For example, the example network 1100 of FIG. 11 includes multiple nodes 1102a-1102h, one or more of which can be a host system such as is illustrated in FIG. 10. Others of the nodes 1102a-1102h can be other computing devices, each of which include at least a memory for storing program instructions, a processor for executing the instructions, and a network interface for connecting to the network 1100.

In various examples, the network 1100 can be used to process data. For example, input data can be received at one of the nodes 1102a-1102h or from other networks 1108 with which the network 1100 can communicate. In this example, the input data can be directed to a node in the network 1100 that includes an acceleration engine, for the acceleration engine to operate on and produce a result. The result can then be transferred to the node or other network from which the input data was received. In various examples, input data can be accumulated from various sources, including one or more of the nodes 1102a-1102h and/or computing devices located in the other networks 1108, and the accumulated input data can be directed to one or more host systems in the network 1100. Results from the host systems can then be distributed back to the sources from which the input data was gathered.

In various examples, one or more of the nodes 1102a-1102h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 11, the nodes 1102a-1102h are connected to one another using a switched architecture with point-to point links. The switched architecture includes multiple switches 1104a-1104d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1104a-1104d of FIG. 11 may be connected to the nodes 1102a-1102h and provide multiple paths between any two nodes.

The network 1100 may also include one or more network devices for connection with other networks 1108, such as a router 1106. Routers use headers and forwarding tables to determine the best path for forwarding the packets, and use protocols such as internet control message protocol (ICMP) to communicate with each other and configure the best route between any two devices. The router 1106 of FIG. 11 can be used to connect to other networks 1108 such as subnets, LANs, wide area networks (WANs), and/or the Internet.

In some examples, network 1100 may include any one or a combination of many different types of networks, such as cable networks, the Internet, wireless networks, cellular networks and other private and/or public networks. The interconnected switches 1104a-1104d and the router 1106, if present, may be referred to as a switch fabric 1110, a fabric, a network fabric, or simply a network. In the context of a computer network, terms "fabric" and "network" may be used interchangeably herein.

The nodes 1102a-1102h may be any combination of host systems, processor nodes, storage subsystems, and I/O chassis that represent user devices, service provider computers or third party computers.

User devices may include computing devices to access an application 1132 (e.g., a web browser or mobile device application). In some aspects, the application 1132 may be hosted, managed, and/or provided by a computing resources service or service provider. The application 1132 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1108. Additionally, the user device(s) may be part of the distributed system managed by, controlled by, or otherwise part of the service provider computer(s) (e.g., a console device integrated with the service provider computers).

The node(s) of FIG. 11 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1132 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1102a-1102h may include at least one memory 1118 and one or more processing units (or processor(s) 1120). The processor(s) 1120 may be implemented in hardware, computer-executable instructions, firmware, or combinations thereof. Computer-executable instruction or firmware implementations of the processor(s) 1120 may include computer-executable or machine-executable instructions written in any suitable programming language to perform the various functions described.

In some instances, the hardware processor(s) 1120 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1118 may store program instructions that are loadable and executable on the processor(s) 1120, as well as data generated during the execution of these programs. Depending on the configuration and type of the node(s) 1102a-1102h, the memory 1118 may be volatile (such as RAM) and/or non-volatile (such as ROM, flash memory, etc.). The memory 1118 may include an operating system 1128, one or more data stores 1130, one or more application programs 1132, one or more drivers 1134, and/or services for implementing the features disclosed herein.

The operating system 1128 may support nodes 1102a-1102h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1128 may also be a proprietary operating system.

The data stores 1130 may include permanent or transitory data used and/or operated on by the operating system 1128, application programs 1132, or drivers 1134. Examples of such data include web pages, video data, audio data, images, user data, and so on. The information in the data stores 1130 may, in some implementations, be provided over the network(s) 1108 to user devices. In some cases, the data stores 1130 may additionally or alternatively include stored application programs and/or drivers. Alternatively or additionally, the data stores 1130 may store standard and/or proprietary software libraries, and/or standard and/or proprietary application user interface (API) libraries. Information stored in the data stores 1130 may be machine-readable object code, source code, interpreted code, or intermediate code.

The drivers 1134 include programs that may provide communication between components in a node. For example, some drivers 1134 may provide communication between the operating system 1128 and additional storage 1122, network device 1124, and/or I/O device 1126. Alternatively or additionally, some drivers 1134 may provide communication between application programs 1132 and the operating system 1128, and/or application programs 1132 and peripheral devices accessible to the service provider computer. In many cases, the drivers 1134 may include drivers that provide well-understood functionality (e.g., printer drivers, display drivers, hard disk drivers, Solid State Device drivers). In other cases, the drivers 1134 may provide proprietary or specialized functionality.

The service provider computer(s) or servers may also include additional storage 1122, which may include removable storage and/or non-removable storage. The additional storage 1122 may include magnetic storage, optical disks, solid state disks, flash memory, and/or tape storage. The additional storage 1122 may be housed in the same chassis as the node(s) 1102a-1102h or may be in an external enclosure. The memory 1118 and/or additional storage 1122 and their associated computer-readable media may provide non-volatile storage of computer-readable instructions, data structures, program modules, and other data for the computing devices. In some implementations, the memory 1118 may include multiple different types of memory, such as SRAM, DRAM, or ROM.

The memory 1118 and the additional storage 1122, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1118 and the additional storage 1122 are examples of computer storage media. Additional types of computer storage media that may be present in the node(s) 1102a-1102h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1102a-1102h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1102a-1102h may also include I/O device(s) 1126, such as a keyboard, a mouse, a pen, a voice input device, a touch input device, a display, speakers, a printer, and the like. The node(s) 1102a-1102h may also include one or more communication channels 1136. A communication channel 1136 may provide a medium over which the various components of the node(s) 1102a-1102h can communicate. The communication channel or channels 1136 may take the form of a bus, a ring, a switching fabric, or a network.

The node(s) 1102a-1102h may also contain network device(s) 1124 that allow the node(s) 1102a-1102h to communicate with a stored database, another computing device or server, user terminals and/or other devices on the network(s) 1100.

In some implementations, the network device 1124 is a peripheral device, such as a PCI-based device. In these implementations, the network device 1124 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1124 may be connected to a computing system using a PCIe interface.

A PCI-based device may include one or more functions. A "function" describes operations that may be provided by the network device 1124. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1124 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for performing distributed training of a neural network model having a plurality of model partitions in a compute system having a plurality of processing nodes, each processing node comprising a plurality of processing ranks, and each processing rank having a rank identifier (ID), the method comprising:
   providing respective training data to each of the processing ranks;
   providing respective model partitions to each of the processing ranks;
   performing a first hierarchical all-gather operation to provide each of the processing ranks with weights of each of the model partitions to execute a forward pass of the neural network model;
   performing a second hierarchical all-gather operation to provide each of the processing ranks with the weights of each of the model partitions to execute a backward pass of the neural network model; and
   performing a hierarchical reduce-scatter operation to provide each of the processing ranks with respective sets of gradients for the model partition of the corresponding processing rank to update the weights of the model partition,
   wherein each of the first and the second hierarchical all-gather operations includes all-gather direct memory access (DMA) transfers to perform an inter-node all-gather operation of non-contiguous memory regions across the processing nodes, and an intra-node all-gather operation of non-contiguous memory regions within each of the processing nodes.

2. The method of claim 1, wherein the hierarchical reduce-scatter operation includes reduce-scatter DMA transfers to perform an intra-node reduce-scatter operation of non-contiguous memory regions within each of the processing nodes, and an inter-node reduce-scatter operation of non-contiguous memory regions across the processing nodes.

3. The method of claim 2, wherein a scatter list for the reduce-scatter DMA transfers is generated based on respective rank IDs of the processing ranks and a storage size of the gradients of each model partition.

4. The method of claim 1, wherein a gather list for the all-gather DMA transfers is generated based on respective rank IDs of the processing ranks and a storage size of the weights of each model partition.

5. A computer-implemented method comprising:
   determining rank identifiers (IDs) respectively assigned to a plurality of processing ranks belonging to each processing node in a plurality of processing nodes; and
   performing a hierarchical collective compute operation for a distributed computation being executed on the plurality of processing nodes,
   wherein the hierarchical collective compute operation includes direct memory access (DMA) transfers to perform an inter-node collective compute operation of non-contiguous memory regions across the processing nodes based on the rank IDs, and an intra-node collective compute operation of non-contiguous memory regions within each of the processing nodes based on the rank IDs.

6. The computer-implemented method of claim 5, wherein the hierarchical collective compute operation is a hierarchical all-gather operation.

7. The computer-implemented method of claim 6, wherein the inter-node collective compute operation is an inter-node all-gather operation, and the intra-node collective compute operation is an intra-node all-gather operation, and wherein the hierarchical all-gather operation includes performing the inter-node all-gather operation before the intra-node all-gather operation.

8. The computer-implemented method of claim 7, wherein the intra-node all-gather operation and the inter-node all-gather operation are pipelined to reduce execution time.

9. The computer-implemented method of claim 6, wherein the hierarchical all-gather operation is performed during a forward pass of the distributed computation to transfer weights of a neural network model.

10. The computer-implemented method of claim 6, wherein the hierarchical all-gather operation is performed during a backward pass of the distributed computation to transfer weights of a neural network model.

11. The computer-implemented method of claim 6, wherein the DMA transfers are performed for the hierarchical all-gather operation to transfer weights of a neural network model based on a gather list, wherein the gather list is generated based on the respective rank IDs of the processing ranks and a storage size of the weights.

12. The computer-implemented method of claim 5, wherein the hierarchical collective compute operation is a hierarchical reduce-scatter operation.

13. The computer-implemented method of claim 12, wherein the inter-node collective compute operation is an inter-node reduce-scatter operation, and the intra-node collective compute operation is an intra-node reduce-scatter operation, and wherein the hierarchical reduce-scatter operation includes performing the intra-node reduce-scatter operation before the inter-node reduce-scatter operation.

14. The computer-implemented method of claim 13, wherein the inter-node reduce-scatter operation and the intra-node reduce-scatter operation are pipelined to reduce execution time.

15. The computer-implemented method of claim 12, wherein the hierarchical reduce-scatter operation is performed during a backward pass of the distributed computation to transfer gradients of a neural network model.

16. The computer-implemented method of claim 12, wherein the DMA transfers are performed for the hierarchical reduce-scatter operation to transfer gradients of a neural network model based on a scatter list, wherein the scatter list is generated based on the respective rank IDs of the processing ranks and a storage size of the gradients.

17. A non-transitory computer readable medium having stored therein instructions that, when executed by one or more processors, cause the one or more processors to execute a compiler, the compiler performing operations including:
   determining rank identifiers (IDs) respectively assigned to a plurality of processing ranks belonging to each processing node in a plurality of processing nodes; and
   performing a hierarchical collective compute operation for a distributed computation being executed on the plurality of processing nodes,
   wherein the hierarchical collective compute operation includes direct memory access (DMA) transfers to perform an inter-node collective compute operation of non-contiguous memory regions across the processing nodes based on the rank IDs, and an intra-node collective compute operation of non-contiguous memory regions within each of the processing nodes based on the rank IDs.

18. The non-transitory computer readable medium of claim 17, wherein the hierarchical collective compute operation is a hierarchical all-gather operation.

19. The non-transitory computer readable medium of claim 18, wherein the inter-node collective compute operation is an inter-node all-gather operation, and the intra-node collective compute operation is an intra-node all-gather operation, and wherein the hierarchical all-gather operation includes performing the inter-node all-gather operation before the intra-node all-gather operation.

20. The non-transitory computer readable medium of claim 17, wherein the hierarchical collective compute operation is a hierarchical reduce-scatter operation.

21. The non-transitory computer readable medium of claim 20, wherein the inter-node collective compute operation is an inter-node reduce-scatter operation, and the intra-node collective compute operation is an intra-node reduce-scatter operation, and wherein the hierarchical reduce-scatter operation includes performing the intra-node reduce-scatter operation before the inter-node reduce-scatter operation.

22. The non-transitory computer readable medium of claim 17, wherein the DMA transfers are based on memory descriptors that are configured based on the rank IDs.

* * * * *